US012558580B2

(12) United States Patent
O'Leary et al.

(10) Patent No.: US 12,558,580 B2
(45) Date of Patent: Feb. 24, 2026

(54) PERSONAL PROTECTIVE EQUIPMENT AND METHODS

(71) Applicant: MDIDEAFACTORY, INC., San Diego, CA (US)

(72) Inventors: Michael O'Leary, Del Mar, CA (US); Daniel Joseph Braun, San Diego, CA (US); Choll Wan Kim, San Diego, CA (US)

(73) Assignee: MDIDEAFACTORY, INC., San Diego, CA (US)

( * ) Notice: Subject to any disclaimer, the term of this patent is extended or adjusted under 35 U.S.C. 154(b) by 363 days.

(21) Appl. No.: 16/726,744

(22) Filed: Dec. 24, 2019

(65) Prior Publication Data

US 2020/0246645 A1 Aug. 6, 2020

Related U.S. Application Data

(63) Continuation of application No. 15/285,191, filed on Oct. 4, 2016, now abandoned.

(Continued)

(51) Int. Cl.

*A62B 18/08* (2006.01)
*A41D 13/11* (2006.01)
*A62B 23/02* (2006.01)

(52) U.S. Cl.

CPC ........ *A62B 18/082* (2013.01); *A41D 13/1184* (2013.01); *A62B 23/025* (2013.01); *A41D 13/1115* (2013.01); *A41D 13/1169* (2013.01)

(58) Field of Classification Search

CPC . B29C 2793/009; B29C 51/30; B29C 51/421; B29K 2067/00; B29K 2995/006;

(Continued)

(56) References Cited

U.S. PATENT DOCUMENTS 5,529,056 A * 6/1996 Brunson ................ A62B 27/00 128/206.25
5,553,608 A 9/1996 Reese et al.

(Continued)

FOREIGN PATENT DOCUMENTS

CN 306178250 11/2020
DE 102004020384 A1 8/2005

(Continued)

OTHER PUBLICATIONS

50pcs Metal Nose Strips. Jul. 17, 2020. Site visited Oct. 17, 2020. [https://www.amazon.com/Anti-Fog-Cushion-Adhesive-ProtectionSupplies/dp/808 06 B LJ B B/ref=sr 1_2_sspa?crid=TPLVOSXZWIOK &keywords=surgical+mask+adhesive&qid=1666027074&qu= eyJxc2MiOilwljAwliwicXNh Ijoi MC4wMCisIn FzcC161jAu M DAifQ (Year: 2020).

(Continued)

*Primary Examiner* — Ophelia A Hawthorne
(74) *Attorney, Agent, or Firm* — Patent Beach PC

(57) ABSTRACT

Improved personal protective equipment facial wear including, in one embodiment, an at least partly adhesive mask, and one or more adhesive eye shields. In one implementation, the mask avoids significant contact with the delicate periorbital skin of the wearer, yet provides a substantially airtight seal so as to preclude moisture vapor transfer and "fogging" of eyeware or instruments. In another implementation, adherence of the eye shield is at least partially overlapping with the mask and creates an at least partial seal around a perimeter of the eye shield. Further, an at least partial seal is formed around a perimeter of the mask. The mask and eye shield additionally prevent nasal air flow obstruction, and address the problem of skin irritation and attachment during normal facial expression and movement of the wearer.

20 Claims, 12 Drawing Sheets

Related U.S. Application Data

(60) Provisional application No. 62/237,449, filed on Oct. 5, 2015, provisional application No. 62/280,520, filed on Jan. 19, 2016.

(58) Field of Classification Search
CPC ...... B29L 2031/4835; B29L 2031/753; A61M 16/047; A41D 13/1161; A41D 13/11; A41D 13/1138; A41D 13/1107; A41D 13/1146; A41D 27/12; A41D 13/1184; A41D 13/1115; A41D 13/1169; A41H 43/04; A61F 2007/0003; A61F 13/0259; A62B 23/025; A62B 18/025; A62B 18/084; A62B 18/02; A62B 18/08; A62B 18/10; A62B 23/02; A62B 7/10; A62B 18/00; A62B 18/082; A62B 23/00; A62B 9/02; A62B 9/06; A62B 17/005; A62B 17/04; A62B 18/006; A62B 19/00; A62B 27/00; A62B 7/00; A62B 9/003; A62B 9/04
See application file for complete search history.

(56) References Cited

U.S. PATENT DOCUMENTS

| | | | | |
|---|---|---|---|---|
| 5,643,668 | A * | 7/1997 | Calhoun | C09J 7/29 428/354 |
| 5,755,681 | A * | 5/1998 | Plews | A61F 13/023 602/54 |
| 5,803,075 | A * | 9/1998 | Yavitz | A41D 13/1115 128/206.28 |
| 5,842,470 | A | 12/1998 | Ruben | |
| 5,899,207 | A * | 5/1999 | Scheinberg | A61F 13/00063 128/893 |
| 5,927,280 | A | 7/1999 | Miyake | |
| 6,116,236 | A | 9/2000 | Wyss | |
| 6,257,235 | B1 | 7/2001 | Bowen | |
| 6,336,456 | B1 | 1/2002 | Ruben | |
| 6,354,296 | B1 * | 3/2002 | Baumann | A41D 13/1115 128/206.25 |
| 6,427,693 | B1 * | 8/2002 | Blackstock | A41D 13/11 128/205.27 |
| 6,543,450 | B1 | 4/2003 | Flynn | |
| 7,017,577 | B2 | 3/2006 | Matich | |
| 7,077,140 | B1 | 7/2006 | Berke | |
| 7,766,015 | B2 * | 8/2010 | Harold | A41D 13/1161 128/201.17 |
| 8,061,356 | B2 | 11/2011 | Bowen | |
| D693,062 | S | 11/2013 | Bowen et al. | |
| D819,800 | S | 6/2018 | Tuan | |
| D854,144 | S | 7/2019 | Bowen | |
| 10,660,385 | B2 | 5/2020 | Nagao et al. | |
| D905,351 | S | 12/2020 | Zheng | |
| D906,597 | S | 12/2020 | Wilson | |
| 10,849,375 | B1 | 12/2020 | Bowen et al. | |
| 11,083,231 | B1 | 8/2021 | Lewis | |
| D945,605 | S | 3/2022 | Bowen et al. | |
| 2003/0136410 | A1 * | 7/2003 | Matich | A62B 18/08 128/206.25 |
| 2006/0130842 | A1 | 6/2006 | Kleman | |
| 2007/0044801 | A1 | 3/2007 | Mathis et al. | |
| 2007/0250976 | A1 | 11/2007 | Beliveau | |
| 2008/0066209 | A1 | 3/2008 | Kayerod | |
| 2008/0110469 | A1 | 5/2008 | Weinberg | |
| 2009/0211582 | A1 | 8/2009 | Reese et al. | |
| 2010/0313890 | A1 | 12/2010 | Messier | |
| 2011/0055998 | A1 | 3/2011 | Tai et al. | |
| 2013/0180529 | A1 | 7/2013 | Matich | |
| 2014/0224261 | A1 * | 8/2014 | Tsuei | A62B 23/025 156/159 |
| 2014/0237695 | A1 | 8/2014 | Al Malki | |
| 2015/0102288 | A1 | 4/2015 | Hersam et al. | |
| 2016/0015098 | A1 | 1/2016 | Conlon | |
| 2016/0029715 | A1 | 2/2016 | Zheng et al. | |
| 2016/0192480 | A1 | 6/2016 | Choi et al. | |
| 2017/0027251 | A1 | 2/2017 | Kang | |
| 2017/0095015 | A1 | 4/2017 | O'Leary et al. | |
| 2017/0208876 | A1 | 7/2017 | Al Malki | |
| 2021/0030085 | A1 | 2/2021 | Harrington et al. | |
| 2021/0337896 | A1 | 11/2021 | Nolan | |
| 2021/0361002 | A1 | 11/2021 | Allmon | |
| 2021/0361005 | A1 | 11/2021 | Sherman et al. | |
| 2022/0117331 | A1 | 4/2022 | Hughes | |
| 2022/0225700 | A1 | 7/2022 | Samuel | |
| 2022/0273055 | A1 | 9/2022 | Picker | |

FOREIGN PATENT DOCUMENTS

| | | | | |
|---|---|---|---|---|
| EP | 2910224 | A1 * | 8/2015 | A61F 13/02 |
| GB | 5004363 | | 8/2016 | |
| JP | 2007061585 | A | 3/2007 | |
| JP | 2008229217 | A | 10/2008 | |
| JP | 2009066382 | A | 4/2009 | |
| KR | 20110008148 | A | 1/2011 | |

OTHER PUBLICATIONS

ADDaSEAL Adhesive Face Mask Strips. Jan. 6, 2021. Site visited Oct. 17, 2022. https://www.amazon.com/AD DaS EAL -Adhesive-Face-Mask-Strips/dp/B08S B7 5ZWZ/ref=sr1_1_sspa? crid =TP L VOSXZWIOK&keywords=surgical+mask+adhesive&qid=1666027074&qu=eyJxc2MiOiIwLjAwliwicXN hljoi MC4wMCisIn FzcCI61jAuMDAifQ% (Year: 2021).

Amazon., "Defender Safety—ASTM Level 3 Face Mask, Pleated, Tie-Back," Aug. 12, 2020. Site visited Oct. 17, 2022. [https://www.amazon.com/DefenderSafetyPleatedTieBackPiy30/dp/808F5K7DHKIref=sr1_7key words=surgical+tie+back+masks&qid=1666036715&qu=eyJxc2MiOilxLjU0liwicXNhljoiMC45MilslnFzcCI61jEuMDAifQ%3D%3D&sprefix=surgical+tie+back+%2Caps%20%2C90&sr=8-7] (Year: 2020).

Amazon., "Halyard Pleated Fog-Free Face Masks, Pleated Tie-On," Jun. 26, 2011. Site visited Oct. 17, 2022. [https://www.amazon.com/Halyard-Pieated-Fog-Free-Face-Masks/dp/B00589T43C/ref=sr1_1_sspa?keywords=surgical+tie+back+masks&qid=1666036715 &qu=eyJxc2MiOilxLjUOiiwicXNhljoiMC45MilsInFzcCl61jEuMDAifQ%3D%3D&sprefix=surgical+tie+back+%2Caps%2C90&sr=8-1-spons&psc=1%20&smid=AFF8XSNGTOQQC] (Year: 2011).

Amazon., "Wecolor 100 Pes Disposable 3 Ply Earloop Face Masks," Dec. 12, 2017. Site visited Oct. 17, 2022. [https://www.amazon.com/dp/B078718WVB/ref=sspa_dk_detail_3%20?pf_rd_p=25e96bbe-93d6-4%20790-9c18-ab0bc96db%2073%207%20&pf_rd_r=VZHA9%20EGKO%20MTFYTOJA%20WX9&pd_rd_wg=PsAVS&pd_rd_w=lbntD&content-id%20=amzn%201%20.sym%20.25e96bbe-93d6-4790-9c18-ab0bc96db737&pd_rd_r=a8309753-6062-474f-83ebce8823f42588&s=apparel&sp_csd=d21kZ2VOTmFtzT1zcF9kZXRhaWxfdGhlbWFOaWM& spla=ZW5jcnlwdGVkUXVhbGimaWVyPUExNOFDVEhQRVpGMUZYJmVuY3J5CHRIZEikPUEwNDc0TMwMihJTkFKVEIIRFNENyZibmNyeXBOZWRBZEikPUEwNTY5NjcxMUFUVIRVQzMyT11yVSZ3aWRnZXROYW11PXNwX2RidGFpbF90aGVtYXRpYyZhY3Rpb249Y2xpY2tSZWRpcmVjdCZkb05vdExvZONsaWNrPXRydWU&th=1] (Year: 2017).

ArchAway 3-in-1 Earloop Face Masks—Double Seal, 50/Pkg. Aug. 24, 2018. Site visited Oct. 17, 2022. [https://www.amazon.com/ArchAway-3-Earloop-Face-Masks/dp/B07GTD62FH] (Year: 2018).

Face Mask Tape Double Sided. Apr. 29, 2021. Site visited Oct. 17, 2022. [https://www.amazon.com/Face-Mask-Tape-Double-Sided/dp/B093S1H68B/ref=sr_1_4?crid=TPLVOSXZWIOK&keywords=surgical+mask+adhesive&qid=1666027074&qu=eyJxc2MiOilwLjAwliwicXNhljoiMC4wMCisInFzcCl61jAuMDAifQ%3D%3].

Thi V.L.D., et al., "A Colorimetric RT-LAMP Assay and LAMP-sequencing for Detecting SARS-CoV-2 RNA in Clinical Samples," Science Translational Medicine, Aug. 2020, vol. 12 (556), 20 pages.

* cited by examiner

PERSONAL PROTECTIVE EQUIPMENT AND METHODS

PRIORITY

This application is a continuation of and claims priority to co-pending U.S. patent application Ser. No. 15,285,191 filed Oct. 4, 2016 of the same title, which claims priority to U.S. Provisional Patent Application Ser. No. 62/237,449 filed Oct. 5, 2015 and entitled "ADHESIVE MASK AND METHODS, as well as U.S. Provisional Patent Application Ser. No. 62/280,520 filed Jan. 19, 2016 and entitled "PERSONAL PROTECTIVE EQUIPMENT AND METHODS", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The disclosure relates to apparatus (e.g., facial wear articles) for covering the nose, mouth, tear ducts, and/or eyes of a wearer. In one exemplary embodiment, the disclosure relates to facial wear which are improved for use in medical procedures (e.g., endoscopic and/or microscopic surgery, treatment of infectious patients, etc.), environments where there is potential exposure to infectious or toxic substances (e.g., natural disaster sites, sewer spills or leakages, locations known to harbor infectious or toxic agents, etc.), and/or worksites requiring clean rooms (e.g., semiconductor fabrication plants, electron gun fabrication plants, etc.).

2. Description of Related Technology

Personal protective equipment (PPE) such as e.g., face masks, face shields, etc. are widely used to, inter alia, prevent the spread of germs and/or exposure to toxic substances. Further, PPE are used to prevent contamination of sensitive equipment and/or materials from particulate matter sloughed from human bodies and clothing. Thus, in healthcare settings, PPE may be worn by surgeons, doctors, nurses, anesthesiologists, technicians, assistants, and other persons permitted into an operating room or other healthcare facility. Additionally, they may be worn during general examinations especially of contagious or potentially contagious persons or animals (e.g., Avian Flu, Ebola virus) and/or immunodeficient persons or animals. Further, persons tasked with environmental clean-up and inspection may wear PPE to protect against environmental exposure to infectious and/or toxic substances. Furthermore, personnel working in clean room settings may be required to wear PPE to protect sensitive equipment and materials from contamination due to particulate matter (e.g., dead skin cells, hair, clothing particles, etc.). Further still, in recent years, worldwide outbreaks of certain serious and highly contagious diseases have prompted individuals to wear PPE masks in daily life (i.e., outside of hospitals and medical treatment facilities). Moreover, individuals in highly air-polluted regions (such as portions of Japan and China) routinely wear a mask in an attempt to filter out harmful airborne substances, or even for some level of protection against ingestion or inhalation of biological agents such as allergens.

Yet further, passengers of communal transportation apparatus (such as e.g., airplanes, buses, trains) may desire protection from airborne agents such as microbes, which in such substantially closed systems, may be readily circulated within the passenger cabin from one passenger to another without filtration. Members of the general population may also desire to wear such gear when they (or others with which they have contact) are infectious, thereby mitigating the spread of such infection.

PPE includes a variety of wearable protective gear including, inter alia, gloves, body suits, foot coverings, aprons, hoods, face coverings (i.e., masks), and eye coverings (i.e., goggles, eye shields, etc.). Wearing of prior art PPE gear may be uncomfortable to the user, which may cause distraction and/or irritation during critical work. Further, movement of the user may cause disruption to the PPE configuration and/or sealing of the PPE. Thus, increasing comfort to the wearer and increasing adherence of the PPE in its proper position is desirable.

A typical PPE mask comprises an air-permeable filter and a mechanism by which the filter may be affixed to the face. In certain configurations, one or more bands, strings, or straps are provided which are intended to tie or fasten at the back of the wearers head. Some masks further include mechanisms to ensure that the mask lays flat against and/or forms a seal or partial seal with the skin surface across the nose and under the eyes. For example, masks may incorporate a thin metal strip or a thin foam strip which is intended to bend or flex in order to match a curvature of the bridge of the nose, and also provide some sort of retention force (e.g., "pinching" a portion of the user's nose bridge). Such metal and foam strips are often uncomfortable for the wearer, restrict air flow (due to inter alia, obstruction of the user's internal nasal valve) which can cause discomfort and loss of some respiratory function of the user, and/or are insufficient at preventing perimeter escape of air during exhalation, thereby causing condensation when a wearer is additionally wearing glasses, eye shields, goggles, and/or using a microscope or endoscope. Such condensation causes viewing obstruction, and hence is highly undesirable. Further, foam and metal strips may provide an insufficient seal for preventing passage toxic, infectious, and/or otherwise contaminating materials through an upper exposed edge of the mask.

Goggles are normally a separate piece of equipment placed on the wearer subsequent to the aforementioned mask, and worn at least partially overlapping the mask. Conventional goggles may include e.g., one or more transparent eye windows supported by a plastic frame and a fastening mechanism for attaching the frame to the head of the wearer. The frame typically includes an indentation to accommodate a bridge of the user's nose. Like the masks described above, the frame is often uncomfortable for the wearer and restricts air flow (due to inter alia, obstruction of the user's internal nasal valve) which can cause discomfort and loss of some respiratory function of the user. In some examples, the frame includes a sealing or partially-sealing material (e.g., foam, rubber, plastic, etc.) at the periphery of the mask for closely securing the mask to the wearer's skin. At the location and/or in proximity to the location of overlap with the mask, however, sealing can be ineffective, thereby permitting passage of toxic, infectious, and/or otherwise contaminating materials through the lower edge of the goggles.

Further, goggles are often stationary, largely inflexible and/or bulky, and therefore unable to conform to normal facial movement and contour. Thus, normal wear alone may cause the seal to become ineffective at any location.

Various solutions have been proposed to improve over the foregoing configurations; i.e., reduce the escape of air from masks, increase the comfort of wearing masks and/or eye shields, eliminate air flow restrictiveness of masks, and/or improve sealing of masks and eye shields. Such solutions, however, often require additional preparation time and are sufficient at only solving one of the problems posed above, while exacerbating the others. In addition, there is currently no solution which takes into account the skin irritation and advanced aging caused by the use of current adhesive masks to extremely delicate facial skin (e.g., the infero-periorbital skin surrounding the eyes).

Hence, what is needed are comfortable PPE facial wear (e.g., masks and eye shields) which are able to perform as a germ and disease (or antigen, chemical or pollutant) guard while preventing (or at least significantly mitigating) escape of air toward a wearer's eyes. Ideally the PPE mask would actively facilitate air flow through the nose, and would take advantage of the unique facial skin regional anatomy, such as by adhering to the thicker skin of the nose and malar eminence (and to some degree lateral-periorbital skin) while sparing the thinnest infero-periorbital skin around the eyes often irritated and chronically damaged by prior art solutions. Additionally or alternatively, the PPE facial wear would effectively seal the region at the top of the mask and at the periphery of the eye shields even during facial movement by the wearer (such as the user talking, making facial expressions, yawning, etc.).

SUMMARY

The present disclosure addresses the foregoing needs by providing, inter alia, an improved PPE facial wear including a face mask portion and an eye protection portion.

In a first aspect, an eye shield is provided. In one embodiment, the eye shield comprises: a window portion configured to be placed over an eye of a wearer; a lip edge disposed at a perimeter of the window portion and laterally extended outward from the perimeter of the window portion; an adhesive portion coupled to the lip edge. The adhesive portion of the eye shield comprises a contoured shape which adheres to the malar, nasal, lateral periorbital, and forehead skin of the wearer. In one variant, the eye shield is fashioned at least in part from a structure akin to a film dressing, thereby providing, inter alia, the adhesive functionality as well as substantial flexibility and ability to contour to the wearer's anatomical features.

In some examples of the above embodiment, an inferior edge of the adhesive portion is configured to at least partially overlap with a superior adhesive portion of a mask covering a mouth and nose of the wearer.

In a second aspect, a mask is provided. In one embodiment, the mask comprises: an air-permeable filter portion configured to be placed over a mouth and nose of a wearer having at least a superior edge, an inferior edge, a first lateral edge, and a second lateral edge; a first adhesive portion coupled to the superior edge; a second adhesive portion coupled to the inferior edge; a third adhesive portion coupled to the first lateral edge; and a fourth adhesive portion coupled to the second lateral edge. The first adhesive portion, second adhesive portion, third adhesive portion, and fourth adhesive portion are configured to adhere to facial skin of the wearer and substantially form at least a partial seal at a perimeter of the air-permeable filter portion.

In another embodiment, the mask includes: an air-permeable portion configured to be placed over a mouth and nose of a wearer, and having at least a top edge; at least one securing feature which is configured to secure the mask to a head of the wearer; and an adhesive portion coupled to the top edge of the first portion. The adhesive portion of the mask comprises a contoured shape configured to adhere to malar and nasal skin of the wearer.

In one variant, the adhesive portion is configured to at least minimize contact with periorbital skin of the wearer when the mask is worn. The minimization of contact with periorbital skin of the wearer when the mask is worn, inter alia, mitigates trauma to the periorbital skin of the wearer when the mask is removed therefrom.

In one implementation, the adhesive portion comprises an adhesive configured to release from any of the periorbital skin contacted thereby without trauma to the periorbital skin when the mask is removed.

In another variant, the air-permeable portion is configured to filter at least a portion of air passing therethrough during use.

In a further variant, the contoured shape of the adhesive portion comprises: (i) two lateral strip elements; and (ii) a nasal bridge feature, the nasal bridge feature having at least a portion thereof which is of lesser height than a height of each of the lateral strip elements, the nasal bridge feature and at least portion thereof to substantially accommodate a bridge of a nose of the wearer while maintaining the two lateral strip elements at respective elevations which avoid contact thereof with periorbital skin of the wearer when the mask is worn.

In yet another variant, the adhesive portion comprises a flexible film dressing having a coefficient of friction and pliability comparable to at least one of the malar or nasal skin, and a thickness of the flexible film dressing is selected so as to permit distortion thereof during normal facial movements of the wearer without causing loss of adhesion.

In another embodiment, the mask is a surgical mask and includes: a substantially rectangular filter portion configured to cover a mouth and nose of a wearer and having two side edges, a top edge, and a bottom edge; at least one strap configured to extend from the first and the second side edges of the filter portion; and a contoured adhesive strip configured to extend upward from the top edge of the filter portion. In one variant, the contoured adhesive strip comprises a flexible adhesive material which is configured to maintain an airtight seal through at least the flexible adhesive material throughout normal facial expression and movement of the wearer for a duration of use thereof.

In one implementation, the mask includes no metallic components, including no deformable metallic nose bridge strip.

In another implementation, the airtight seal prevents transmission of at least water vapor generated by nose or mouth of the wearer from reaching any optical or optometric prosthesis or devices which the wearer uses, so as to avoid fogging or occlusion thereof. The contoured adhesive strip is configured to, inter alia, mitigate contact or overlap with periorbital skin of the wearer.

In another embodiment, the mask includes: an air-permeable filter portion configured to be placed over a mouth and nose of a wearer, the air-permeable filter having at least a superior edge, an inferior edge, a first lateral edge, and a second lateral edge; a first adhesive portion coupled to the superior edge; a second adhesive portion coupled to the inferior edge; a third adhesive portion coupled to the first lateral edge; and a fourth adhesive portion coupled to the second lateral edge. The first adhesive portion, second adhesive portion, third adhesive portion, and fourth adherent portion are each configured to adapt to the unique facial skin micro-anatomy of the wearer and form at least a partial seal at a perimeter of the air-permeable filter portion.

In one variant, the adaptation to the unique facial skin micro-anatomy of the wearer for at least the first adhesive portion comprises at least adaptation to thick skin of a malar eminence of the wearer, while avoiding adjacent thin skin of a pariorbita of the wearer.

In a further aspect, protective apparatus is disclosed. In one embodiment, the protective apparatus includes: a window portion configured to be placed over an eye of a wearer; an edge element disposed at a perimeter of the window portion and laterally extended outward from the perimeter of the window portion; and an adhesive portion coupled to the edge element.

In one variant, the adhesive portion of the protective apparatus comprises a contoured shape which is configured to adhere to malar, nasal, and forehead skin of the wearer. In one implementation thereof, an inferior edge of the adhesive portion is configured to at least partially overlap with a superior adhesive portion of a mask covering a mouth and nose of the wearer.

In another variant, the adhesive portion is configured to avoid contact or overlap with non-lateral periorbital skin of the wearer.

In yet another variant, the apparatus further comprises an anti-fog coating disposed on at least a portion of the window portion.

In yet a further variant, the apparatus further comprises air-circulating apparatus configured to circulate air within at least an interior volume created by the protective apparatus when adhered to the skin of the wearer over the eye. In one implementation, the air-circulating apparatus further comprises microbe filtration apparatus configured to filter at least a portion of the circulated air.

In a further variant, the window portion is convex so as to form a cavity proximate the eye, wherein the window portion is sized so that the adhesive portion avoids contact or overlap with non-lateral periorbital skin of the wearer when the protective apparatus is worn.

In a third aspect, PPE facial wear is provided. In one embodiment, the PPE facial wear comprises: a mask having an air-permeable filter portion configured to be placed over a mouth and nose of a wearer, a superior edge of the filter portion having a first adhesive portion, the first adhesive portion of the mask having a contoured shape which is configured to adhere to malar and nasal skin of the wearer, and an eye shield having a window portion configured to be placed over an eye of the wearer, a lip edge disposed at a perimeter of the window portion having a second adhesive portion attached thereto, the second adhesive portion of the eye shield having a contoured shape which is configured to adhere to malar, nasal, lateral periorbital, and forehead (including e.g., sincipital) skin of the wearer. During wear, the second adhesive portion is configured to at least partially overlap with the first adhesive portion.

In another aspect, personal protective apparatus is disclosed. In one embodiment, the apparatus includes: a mask having an air-permeable filter portion configured to be placed over a mouth and nose of a wearer, a superior edge of the filter portion having a first adhesive portion, the first adhesive portion of the mask having a contoured shape which is configured to adhere to malar and nasal skin of the wearer; and an eye shield having a window portion configured to be placed over an eye of the wearer, a lip edge disposed at a perimeter of the window portion having a second adhesive portion attached thereto, the second adhesive portion of the eye shield having a contoured shape which is configured to adhere to malar, nasal, lateral periorbital, and forehead skin of the wearer. In one variant, the second adhesive portion is configured to at least partially overlap with the first adhesive portion.

In a further aspect, a method of applying an eye shield, a mask, and/or PPE facial wear (such as, e.g., those discussed above) to a wearer is disclosed.

In a further aspect, a method of using an eye shield, a mask, and/or PPE facial wear (such as, e.g., those discussed above).

In a further aspect, a method of removing an eye shield, a mask, and/or PPE facial wear (such as, e.g., those discussed above).

In a further aspect, a method of enhancing a user's respiratory function is disclosed.

In yet a further aspect, a contour adhesive strip for use with a mask and/or an eye shield is disclosed.

In still a further aspect, a method of preventing or mitigating fogging of an optical device is disclosed.

Other features and advantages of the present disclosure will immediately be recognized by persons of ordinary skill in the art with reference to the attached drawings and detailed description of exemplary embodiments as given below.

Figure 1A:
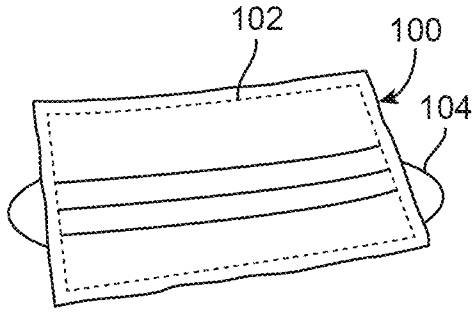
FIG. 1A is a front perspective view of a prior art adhesive PPE mask.

All figures © Copyright 2015-2016 MD Idea Factory™. All rights reserved.

DESCRIPTION OF THE DISCLOSURE

Reference is now made to the drawings listed above, wherein like numerals refer to like parts throughout.

As used herein, the term "adhesive" refers generally and without limitation to any substance used for sticking or bonding objects or materials together, such as a substance which is applied to one or more objects and which, once placed in physical contact, at least temporarily resists a separation of the objects or materials. Adhesives generally include without limitation, glues, epoxies, tapes, synthetic or chemical products, and natural binding agents.

As used herein, the terms "fastener" and "strap" refer generally and without limitation to any means for buckling, fastening, binding, and/or securing objects. As used herein, fasteners and/or straps may be made of any number of materials including, without limitation, cloth, paper, ribbon, string, malleable plastic or thin metals, etc. In addition, straps or fasteners may be secured via any number of securing means such as via tying, ratcheting, pin and hole (such as is found on a belt), glue or other adhesive, Velcro®, etc.

As used herein, the terms "mask" and "surgical mask" refer generally and without limitation to any facial covering whether transparent or opaque intended to cover any portion of a wearer's face, neck, throat, ears, eyes, and/or head, despite an intended use or purpose thereof.

As used herein, the term "film dressing" refers generally and without limitation to thin adhesive patches or strips which are generally known as being sterile, transparent and highly flexible. However, it is appreciated that opaque film dressing, whether sterile or not, or yet other configurations, may be used with equal success consistent with the present disclosure as applicable. Exemplary implementations of such film dressings provide a moist, healing environment; promote autolytic debridement; protect against mechanical trauma and bacterial invasion (such as e.g., when used on a wound); and act as a blister roof or "second skin." Although exemplary types of film dressings cannot absorb any significant amounts of fluid, they may be permeable to moisture-allowing one-way passage of carbon dioxide and excess moisture vapor away from e.g., a subject's skin.

As used herein, the term "eye shield" refers generally and without limitation to any eye covering intended to cover and protect one or more eyes of a wearer.

Overview

The present disclosure provides, inter alia, improved adhesive PPE facial wear. In one embodiment, an improved adhesive PPE mask provides one or more of the following features: (i) particular utility for surgical applications, toxic or infectious environmental applications, and/or clean room applications; (ii) comfort for the wearer; (iii) ability to perform as a germ and disease guard for extended periods; (iv), prevention of escape of air toward a wearer's eyes (which can cause, inter alia, condensation or fogging of instruments or the user's glasses, as well as microbial release through atomization or aerosolization of the user's breath); (v) facilitation of air flow in through the nose by expanding the internal nasal valves; and (vi) a design contoured to the appropriately durable facial skin regions while avoiding the thinnest, most delicate infero-periorbital regions and thereby reducing the skin irritation and advanced aging caused by other masks.

Exemplary adhesive PPE eye shields may be used alone or in conjunction with the foregoing mask, and provide one or more of the following features: (i) particular utility for surgical applications, toxic or infectious environmental applications, and/or clean room applications; (ii) comfort for the wearer, (iii) ability to perform as a germ and disease guard for extended periods; (iv), enhanced sealing at the lower edge of the eye shield overlapping with or proximal to an upper edge of the PPE mask; and (v) enhanced sealing at the periphery of the eye shield, and resistance to seal failure due to facial movements of the wearer. In some exemplary implementations, the eye shield(s) disclosed herein may further be configured (e.g., by virtue of density, material of construction, and/or other factors) to function as a barrier to e.g., fluids, as well as microbes or other agents of the type previously referenced. For instance, such eye shield(s) can function to protect the eyes of the user from liquid intrusion, such as use for watersports, or being splashed during e.g., chemical handling or mixing operations, surgical procedures, or any number of different activities.

In one specific embodiment, the PPE mask comprises an air-permeable filter portion configured to be placed over the mouth and nose of a wearer, a securing feature which is configured to secure the mask to the head of the wearer, and an adhesive portion. The adhesive portion of the mask advantageously comprises a contoured shape which adheres to the malar and nasal skin of the wearer, and which avoids contact with the thinnest and thus more sensitive infero-periorbital skin.

In another specific embodiment, each PPE eye shield comprises a window portion configured to be placed of one or more eyes of a wearer, a lip edge of on a perimeter of the window portion, and an adhesive portion attached at the lip edge. In one exemplary application, the eye shield is used alone or worn underneath a mask, and an adhesive portion of the eye shield(s) advantageously comprises a contoured shape which may adhere to the forehead, malar, and nasal skin of the wearer, and which avoids contact with the thinnest and thus more sensitive infero-periorbital skin. In another exemplary application, the eye shield is used in combination with a mask (such as that previously referenced), and the adhesive portion may adhere to the filter portion and/or the adhesive portion of the mask.

Additionally, for the adhesive portion of both the exemplary mask and eye shield, the contoured adhesive portion further advantageously comprises a substantially flexible material which is configured to maintain an airtight seal for extended periods throughout normal facial expression and movement of the wearer, and which is highly resistive to slippage or degradation due to user perspiration. Depending on the particular adhesive chosen, the exemplary embodiments of the mask also provide for enhanced tactile dexterity (i.e., the adhesive, while effective, is not overly "sticky" or difficult to handle, and hence easier to manipulate when donning or removing the mask), and leaves effectively no residual adhesive on the user's facial skin, reducing adhesive irritation and obviating the need for scrubbing or scraping of the delicate facial skin to remove residuals.

Description of Exemplary Embodiments

It is noted that while the apparatus of the disclosure described herein are discussed primarily with respect to use by a physician or other medical personnel during medical treatment, certain aspects of the disclosure may be useful in other applications, including, without limitation, non-medical uses, such as painting buildings (interior and exterior), salon and nail care uses, construction, and/or during every day wear to prevent the spread of disease or the ingestions of antigens, chemicals or pollutants. Further, the apparatus may be used in environments where there is potential exposure to toxic and/or infectious materials, or in work places such as those requiring a maintenance of a "clean room" environment.

Current Technology

In order to provide a better understanding of the improved mask disclosed herein, various ones of the current technologies previously referenced (and the attendant limitations of each) are now discussed in greater detail.

Current mechanisms by which a superior aspect of a mask are "sealed" commonly employ adhesives, plastic or foam strips and/or elastic/compressive components.

FIG. 1A is an image of a prior art surgical mask 100 having an adhesive. As illustrated in FIG. 1A, the superior or top aspect of the mask 100 comprises a removable backing 102 which protects the adhesive disposed underneath. To wear the mask 100, the backing 102 is removed and the two elastic loops 104 are stretched to encircle the wearer's right and left ear, respectively; and the adhesive portion 101 is pressed against the users face below the eyes and across the bridge of the nose. As will be discussed in further detail below, adhesive masks such as that of FIG. 1 are often too sticky, and therefore hurt or damage skin when removed, and/or leave adhesive residue on the skin when removed. In addition, current adhesive masks loosen over time due to the significant coefficient of friction between the thick mask and the wearer's skin. This differential is exacerbated by perspiration which is common in, e.g., long surgical procedures under intense operating room ("OR") lights). Such loosening disrupts the seal between the mask and the wearer. Loosening may lead to the escape of exhaled air upwards toward the wearer's eyes, and thereby occlude vision and/or create "fog" in a lens of the wearer's glasses or other ocular device due to moisture present in the exhaled volume. Loosening may further lead to discomfort, annoyance and/or full failure of the mask during operation, which wastes both money and time by requiring replacement mid-operation. Finally, due to the rectangular shape of the mask 100, adhesion occurs indiscriminately including both the thick malar and nasal skin as well as the thin infero-periorbital skin.

Figure 1B:
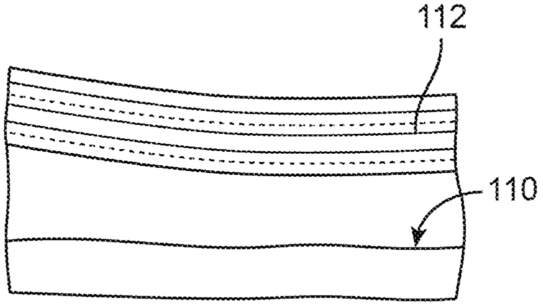
FIG. 1B is a plain view of a prior art PPE mask having a compression metal strip.
Figure 1C:
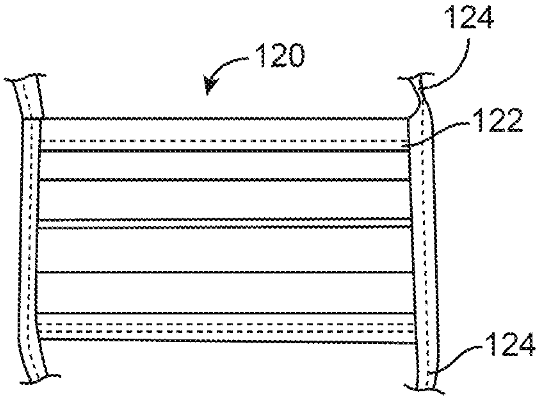
FIG. 1C is a face side perspective view of a prior art PPE mask having a foam strip.

FIG. 1B is an image of a prior art surgical mask 110 having a plastic strip 112. FIG. 1C is an image of a prior art surgical mask 120 having a foam strip 122. To wear the surgical mask 110 having the plastic strip 112 or the surgical mask 120 having the foam strip 122, a user places the plastic strip 112 or foam strip 122 across the bridge of his/her nose, and then secures the mask 110 or 120. In the illustrated embodiment, the foam strip mask 120 further comprises four straps 124 which are intended to be joined behind the wearer's head. In this example, two top or superior straps 124 are pulled above a wearer's ears and joined to one another such as by tying; and two lower or inferior straps 124 are pulled below or across a wearer's cars and joined to one another, such as by tying. Although the view of the surgical mask 110 having a plastic strip 112 does not provide straps or fasteners, it is appreciated that any of those disclosed above with respect to FIGS. 1A and 1C may be utilized with the design of FIG. 1B to secure the mask to the wearer's head. A common problem with the masks of FIGS. 1B and 1C is that they are completely insufficient to form a seal between the mask and its wearer, especially at the superior aspect (i.e., under the eyes and across the nose). The insufficient seal causes loosening which may lead to the escape of moist air upwards toward the wearer's eyes, and may further lead to discomfort, annoyance and/or full failure of the mask during operation.

Figure 1D:
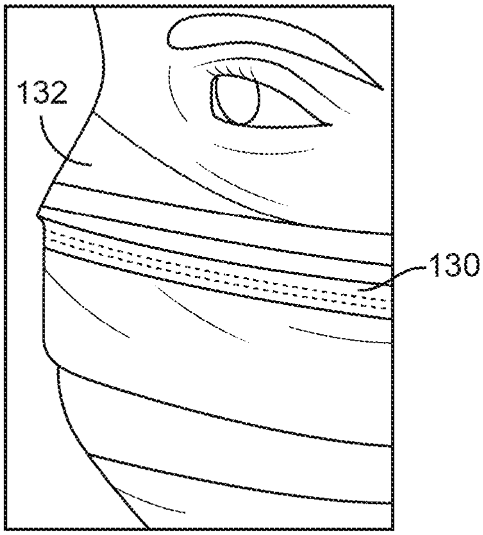
FIG. 1D is a side perspective view of a wearer of a prior art PPE mask with a compression metal strip having applied supplemental adhesive tape to secure the prior art mask.

In a further embodiment, as illustrated in FIG. 1D, any of the foregoing masks (i.e., those of FIGS. 1A-1C) may be further provided with a compression strip 130 made of plastic or other bendable material. The compression strip 130 is intended to increase the seal between the mask and its wearer, thereby avoiding problems discussed above. However, in order to obtain an adequate seal with compression strips 130, they must be compressed to a point which obstructs nasal valve patency. Accordingly, a wearer suffers discomfort and/or difficulty breathing through the nose.

FIG. 1D further illustrates the use of supplemental adhesives 132 (in this case, tape) to secure the mask to the wearer's face. As shown, subsequent to normal facial movement and/or perspiration, the adhesives 132 lose their effectiveness and pull away from the skin of the wearer. Therefore, these supplemental solutions do not resolve the insufficient seal of the other approaches. Such adhesives leave a residue on the skin which can be irritating and difficult to completely remove.

Figure 1E:
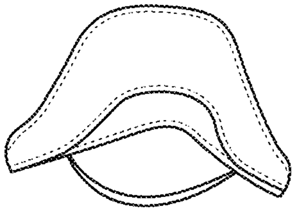
FIG. 1E is a side perspective view of a prior art PPE mask which utilizes elastic compression.

FIG. 1E is an image of a prior art surgical mask which utilizes elastic compression. The tensions required to decrease airflow become uncomfortable on even short durations and remain insufficient in blocking air escape, resulting in subsequent ocular fogging and vision obstruction.

Current mechanisms by which one or more eyes of a user are shielded commonly employ face shields, goggles, or eye masks. These may include adhesives, plastic or foam strips and/or elastic/compressive components at the periphery of the device.

Figure 5B:
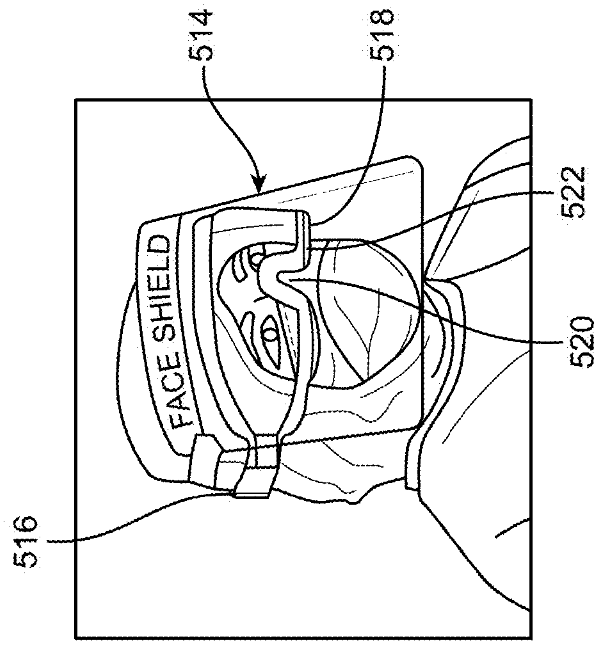
FIG. 5B is a side perspective view of a wearer of a prior art PPE mask, hood, face shield, and goggles.
Figure 5D:
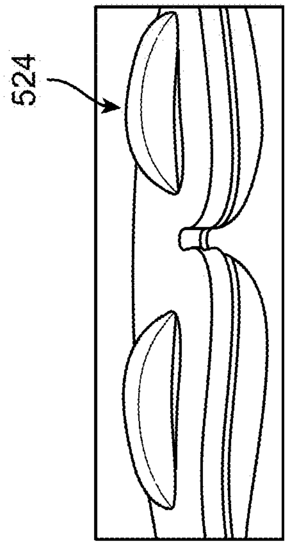
FIG. 5D is a bottom perspective view of a prior art PPE eye shield.
Figure 5A:
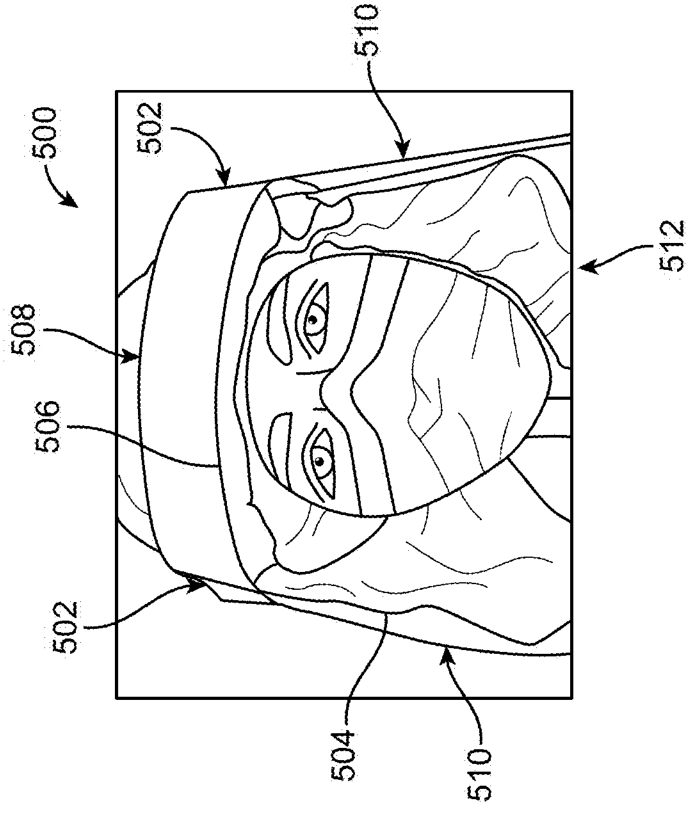
FIG. 5A is a front perspective view of a wearer of a prior art PPE mask, hood, and face shield.

FIG. 5A is an image of a prior art face shield 500 worn in combination with a mask and hood. As depicted in FIG. 5A, the face shield 100 includes a user-tightened and/or elastic band (not specifically shown) that encompasses a user's head proximal to or at the region of the parietal ridge. The band is attached at opposing superior corners 502 of a face shielding window 504. A foam cushion 506 is attached to a superior edge 508 of the window 504, and is configured to cushion pressure against and conform to the wearer's sinciput. Although the eyes shielded from the front and top, as shown in FIG. 5A, lateral edges 510 and an inferior edge 512 of the window 504 are substantially open and permit passage of liquids, gases, microbes, and particulate matter. Therefore, the face shield 500 worn alone clearly provides insufficient eye protection.

FIG. 5B shows a prior art pair of goggles 514 worn in combination with a mask, hood, and face shield (substantially similar to face shield 500 shown in FIG. 5A). The goggles 514 include a user-tightened and/or elastic band 516 that encompasses a user's head proximal to or at the region of the temple. In the present example, the band 516 is worn below a band of the face shield. The band 516 is attached to opposing sides of a substantially rigid frame 518, which is configured to accommodate a bridge of the user's nose at an indentation 520. A perimeter of the frame 518 includes a substantially flexible perimeter wall or blade 522 that overlaps or at least partially overlaps with the mask and hood. In this example, the flexible wall 522 is intended to provide an impermeable seal with the skin of the wearer. At the locations where the wall contacts the mask or the hood rather than the user's skin, however, the wall may be unsealed and thus permit passage of liquids, gases, microbes, and particulate matter.

Figure 5C:
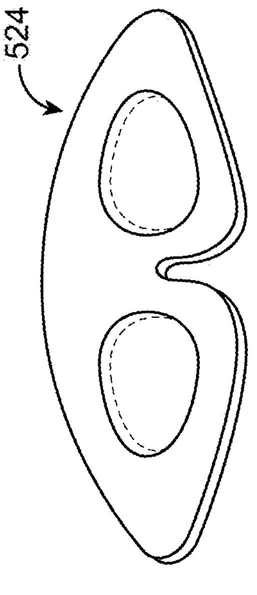
FIG. 5C is a front perspective view of a prior art PPE eye shield.

FIGS. 5C and 5D show an alternative prior art eye shield 524. The foam portion of the eye shield is used to cushion the rigid portion of the eye shield from the wearer's delicate face and cheek, thus improving the comfort of the device. In addition, the foam allows the eye shield to be applied with some pressure, which may be necessary for establishing a tight seal. Furthermore, the foam and adhesive create a barrier against microbe penetration and transmission Anatomical Considerations—

The human facial anatomy presents various challenges with which a PPE mask and/or eye shield must coordinate to provide coverage while maintaining comfort and usability. Specifically, there are changes in shape and contour, texture and/or thickness of the skin in different regions, regions which perspire greater than others, muscular movements in varying regions (such as during facial expressions and communication made by the wearer), areas of different sensitivity, etc.

Accordingly, in one exemplary aspect, the present disclosure provides an improved mask which is configured to maintain a seal between the superior aspect of the mask and the wearer's skin in such a way that does not damage the sensitive infero-periorbital skin. Further, the present disclosure provides improved eye shields which may be used alone or in combination with the improved mask. When used in combination with the improved mask, the exemplary eye shields are configured to maintain both a seal between the superior aspect of the mask and an inferior aspect of the eye shield and a seal with the wearer's skin at regions of the eye shield that do not overlap with the mask. When used alone, the eye shield is configured to maintain a seal between the periphery of the eye shield window and the user's skin.

Figure 2A:
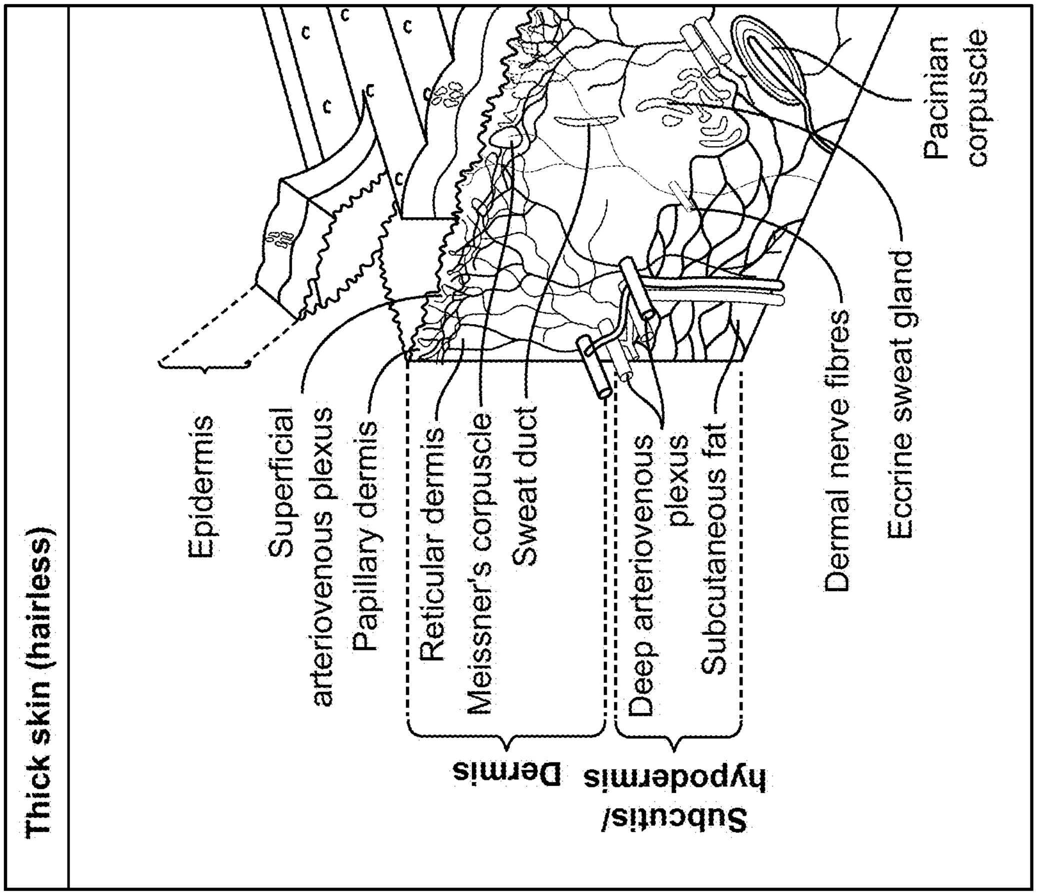
FIG. 2A is an illustrated representation of typical skin surface layers at areas of increased thickness
Figure 2B:
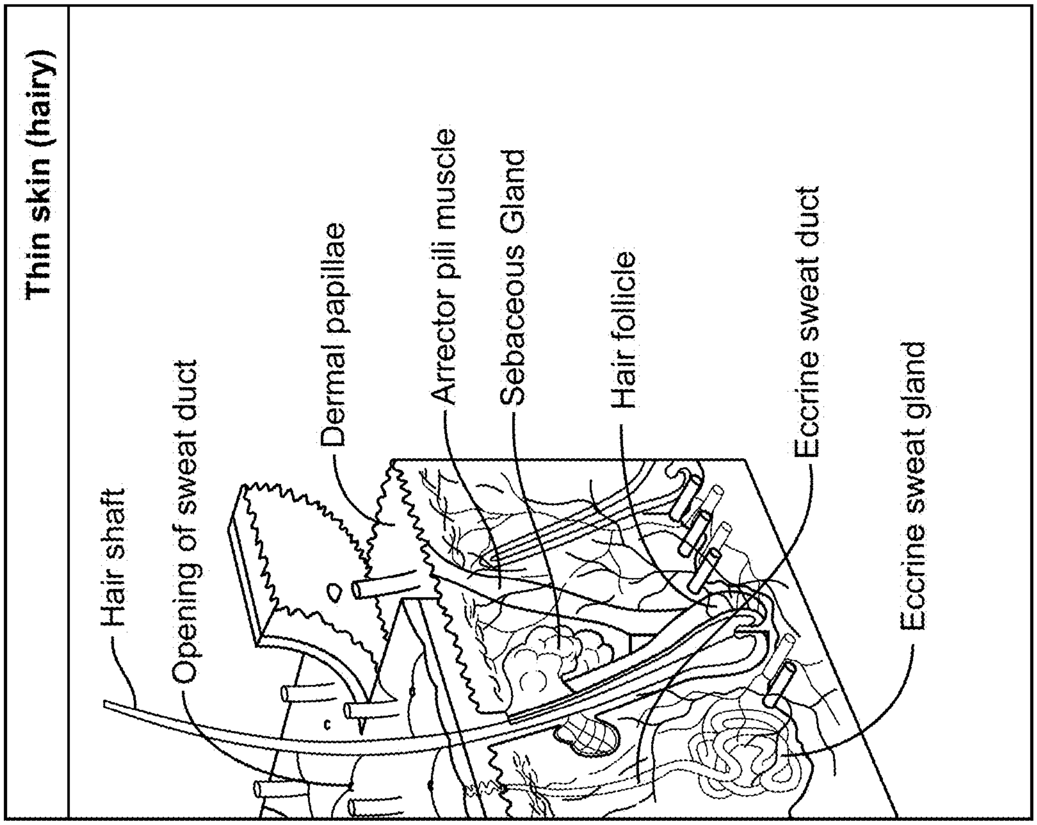
FIG. 2B is an illustrated representation of typical skin surface layers at areas of decreased thickness.

As noted above, adhesive masks and/or eye shields are often too sticky and therefore require excessive pulling on the skin to remove. These adhesive masks and eye shields do not take into account the physiological differences between thick, durable (>3 mm) skin as shown in FIG. 2A, and the immediately adjacent thin, ultra-delicate skin (0.5 mm) as shown in FIG. 2B, on a user's face. Specifically, the portion of the skin which includes the top of a human's cheeks and nose is referred to as the malar-lateral nasal skin, and is of the type illustrated in FIG. 2A. The portion of the skin just below the human's eyes, referred to as the infero-periorbital skin, which is among the thinnest, most delicate skin of the body, and is illustrated in FIG. 2B.

As can be seen in FIGS. 2A and 2B, there is a large difference in the thickness of the epidermal layers of each skin type. Hence, harsh scrubbing, scratching, traction and pulling or otherwise manipulating this skin is not desirable. Moreover, such treatment of this delicate tissue leads to advanced infero-periorbital skin "aging" such as e.g., "Crow's Feet" and festoon development. The repetitive trauma of peeling off current adhesive masks (such as the mask 100 of FIG. 1A) and/or of scrubbing off adhesive residue (as occurs with the masks 100 of FIG. 1A described above) renders the extant prior art technology unable to meet the needs of current consumers.

Figure 2C:
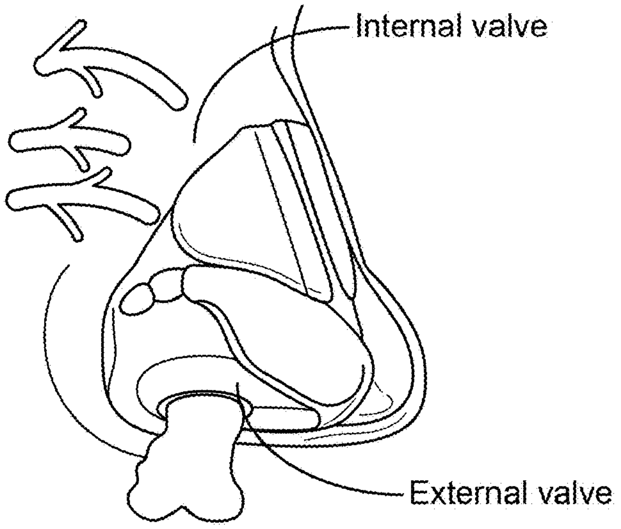
FIG. 2C is an illustrated representation of a typical nasal passage demonstrating the internal and external physiologic "valves".

FIG. 2C is an illustrated representation of a typical nasal passage. As noted previously, certain ones of the currently available masks, such as are illustrated in FIG. 1D, utilize compression strips 130 to create a firm seal between the mask and the wearer's face. Also noted previously, conventional goggles, such as those shown in FIG. 5B, include a substantially rigid frame having an indentation for accommodating a bridge of the wearer's nose. However, as illustrated in FIG. 2C, the nasal passage comprises both an internal and an external nasal valve. Severe compression of the compressions strips 130 and/or compression of the rigid goggle frame against the user's nasal bridge results in at least partial obstruction of the internal nasal valve. This results in discomfort and inability of the wearer to breathe comfortably.

Figure 2D:
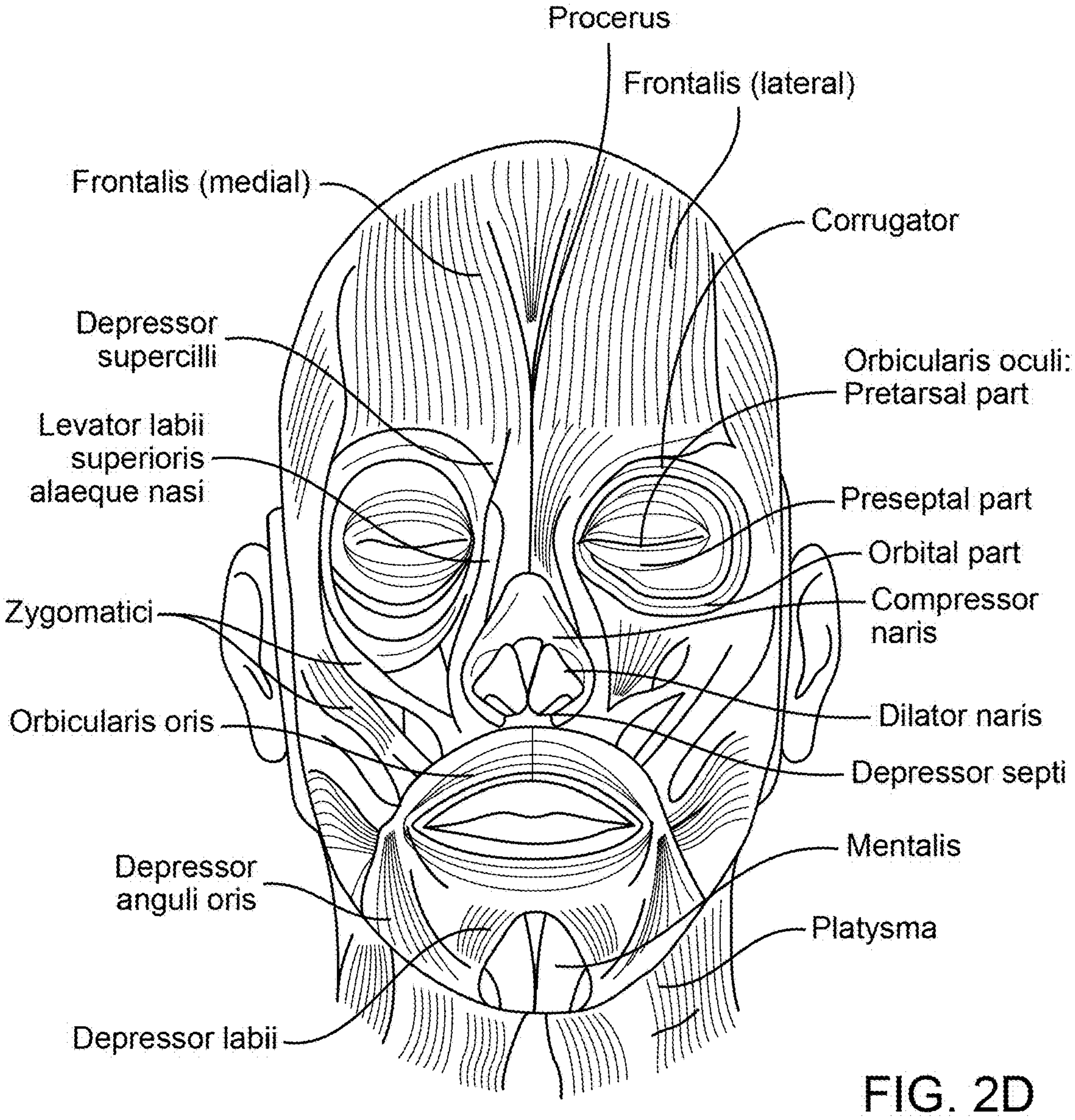
FIG. 2D is an illustrated representation of a typical facial muscle configuration that underlies PPE articles worn on or otherwise attached to a user's face.

FIG. 2D depicts an illustrated example of a typical muscular structure that underlies PPE facial wear. There are 43 muscles that are known to contribute to facial expression and communication. Particularly muscles in the sincipital and malar regions of the face are prone to movement during facial expression and communication. During wear of facial PPE, skin of the sincipital region is contacted by an eye shield (e.g., goggles), while skin of the malar region is contacted by a mask and/or eye shield. Thus, normal facial expression and communication can contribute to disruption of mask and/or eye shield seals.

Moreover, no PPE mask has been developed that specifically addresses the unique facial anatomical transition from the thick, firm, tough malar and nasal skin to the most delicate and mobile infero-periorbital skin. Protecting the patency of the nasal valves has also not been adequately addressed in either of PPE masks or eye shields. The present disclosure provides, inter alia, an improved mask and eye shield which addresses each of the above unique physiological concerns (and others), as described in greater detail below.

Improved Mask—

Figure 3B:
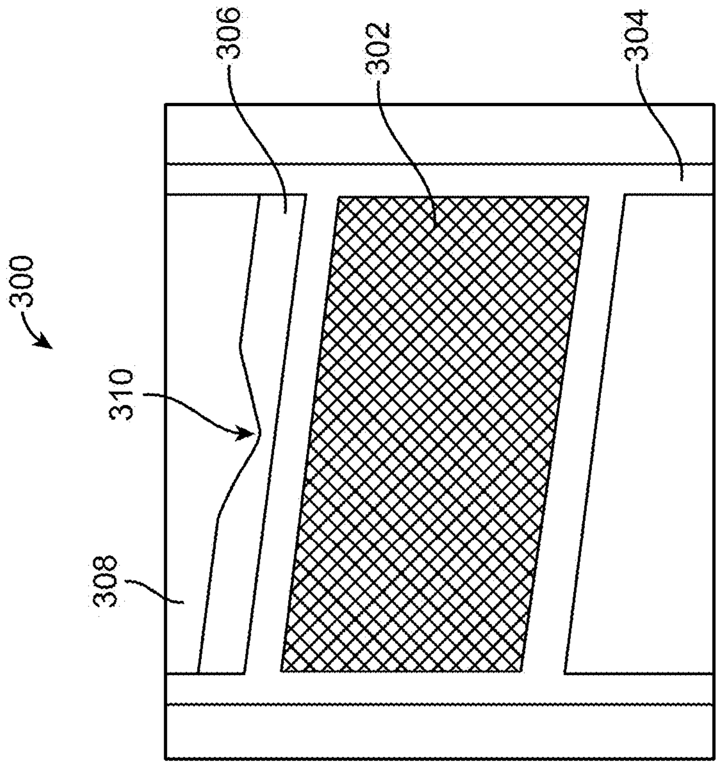
FIG. 3B is a representative model of an exemplary improved adhesive PPE mask according to the present disclosure.
Figure 3A:
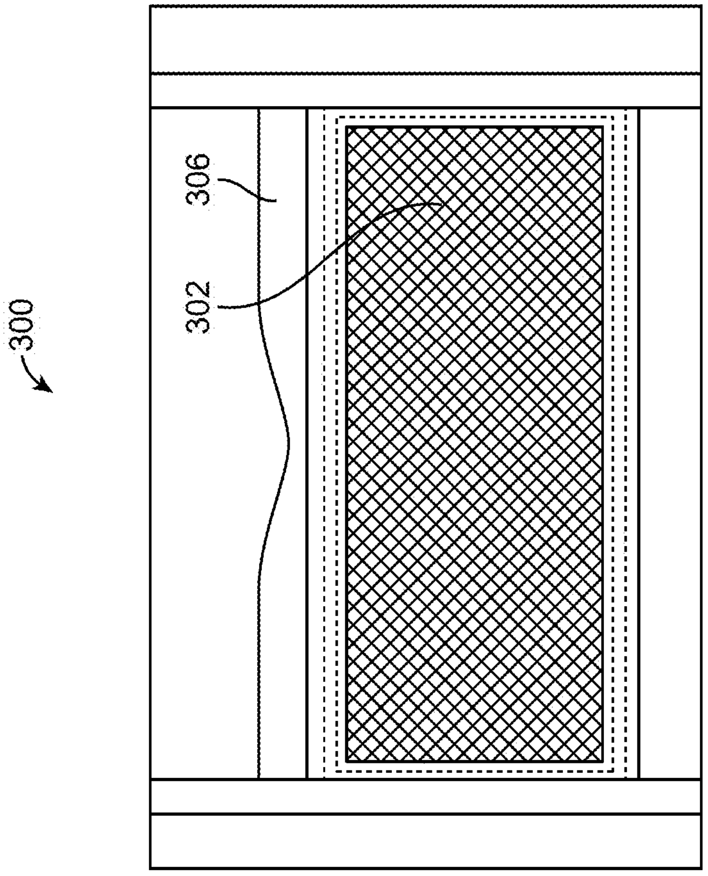
FIG. 3A is a representative model of a front view of an exemplary improved adhesive PPE mask according to the present disclosure.

Referring now to FIGS. 3A and 3B, representative models showing front views of an exemplary improved adhesive PPE mask 300 according to a first implementation of the present disclosure are given. As shown, the mask 300 generally comprises a paper-based filtration portion 302, one or more fasteners 304, and a superior anatomically shaped film dressing portion 306 configured to engage with skin in nasal and medial malar regions of the wearer's face.

The paper filtration portion 302 is a semi-permeable paper barrier used to guard against transmission of germs (and other agents or substances) via the mouth. The fasteners 304 of the illustrated embodiment comprise four paper strings which are intended to be secured around the wearer's head, such that the top two strings are pulled above the wearer's ears and joined together, and the bottom two strings are pulled below the wearer's ears and joined together. It is appreciated however, that any number and type of fasteners may be utilized with equal success. For example, the fasteners may comprise Velcro®, bendable or flexible wire, elastics, etc.

The extremely thin and flexible film dressing portion 306 has a coefficient of friction and pliability similar to the facial skin which eliminates the disruptive shear effect compromising the seal in traditional paper masks. The previously unrecognized advantage of utilizing a film dressing, most notably in the present context, is that this material is configured to adjust comfortably to the skin of the wearer as he/she moves (such as to talk, make facial expressions, etc.). Additionally, film dressing is specifically designed to remain adherent to the skin for extended periods despite perspiration. Other advantageous features of the film dressing 306 will be discussed in greater detail below.

As illustrated in FIGS. 3A and 3B, in one exemplary embodiment, the film dressing 306 is specifically shaped to accommodate the shape and curvature of a wearer's face. In the illustrated embodiment, the film dressing portion 306 comprises a dip or depression 310 which is intended to conform to the wearer's nasal bridge. In this manner, the two portions of the film dressing 306 on either side of the depression 310 are of sufficient height so as to be affixed just below the infero-periorbital skin of the wearer. Additionally, the depression 310 is of sufficient height to accommodate glasses or other eyewear. In a further embodiment, the film dressing 306 may further comprise a raised section, of any geometric shape (including e.g., a flat strip), which aides in contouring to facial anatomy.

As also illustrated, the mask 300 comprises one or more simple mask removal tabs 308, the mask removal tabs 308 simplify removal of the mask without irritation to the delicate infero-periorbital skin. The removal tabs 308 assist in the removal of the adhesive dressing from the users malar and nasal skin. They are shaped to allow simplified removal process wherein the user feels for the tabs without the need to look in mirror. In this manner, the wearer is not required to make any abrasions to the delicate infero-periorbital skin (such as by scratch at the interface of the dressing and the skin to pull up an edge or corner).

It will be appreciated that while human faces are generally somewhat similar in the region of interest (i.e., area of nose, bridge, periorbital regions, etc.), significant variations from individual to individual may exist, including variations in dimensions, angles, textures, and other features which may affect the performance of the mask described herein. Moreover, the transition of skin types may occur at different areas, and other differences may exist.

Accordingly, while the exemplary embodiments of the mask described herein advantageously can generally adapt to such variations (e.g., through use of the aforementioned film dressing), the present disclosure also contemplates the creation of user-customized masks which are particularly adapted to the wearer. For example, in one implementation, a 3D model of the relevant portions of the user's face (such as via a laser or optical scan of the wearer's face) is created, and this information used to particularly adjust one or more aspects of the mask construction. Hence, user-specific lots of masks, such as for surgeons who routinely wear them, can be fabricated and provided (including e.g., labeling such as a colored dot or printed name on the mask front, which can be used to identify the proper mask for a given individual).

Figure 4A:
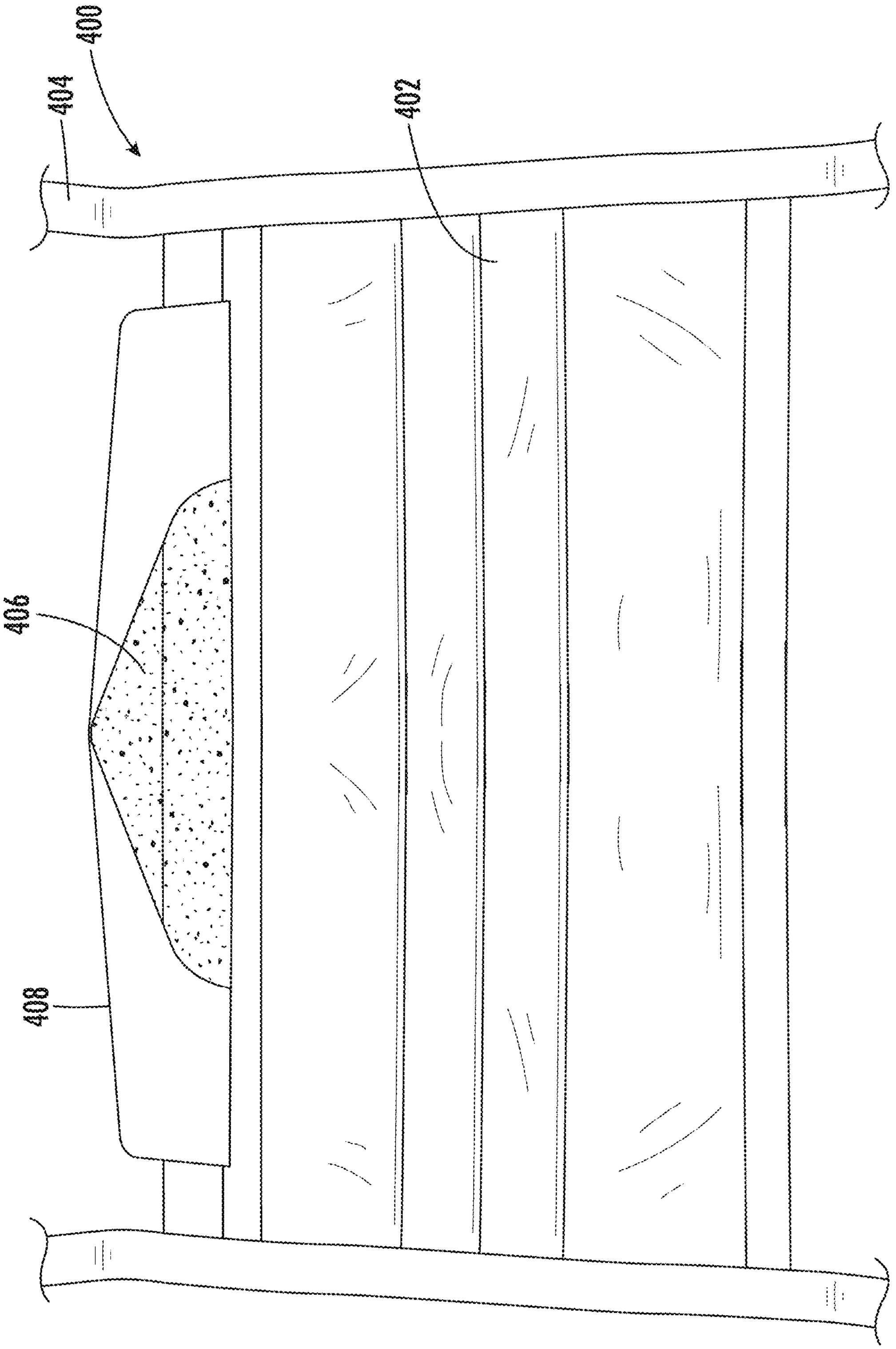
FIG. 4A is a front view of an exemplary improved adhesive PPE mask according to the present disclosure.
Figure 4B:
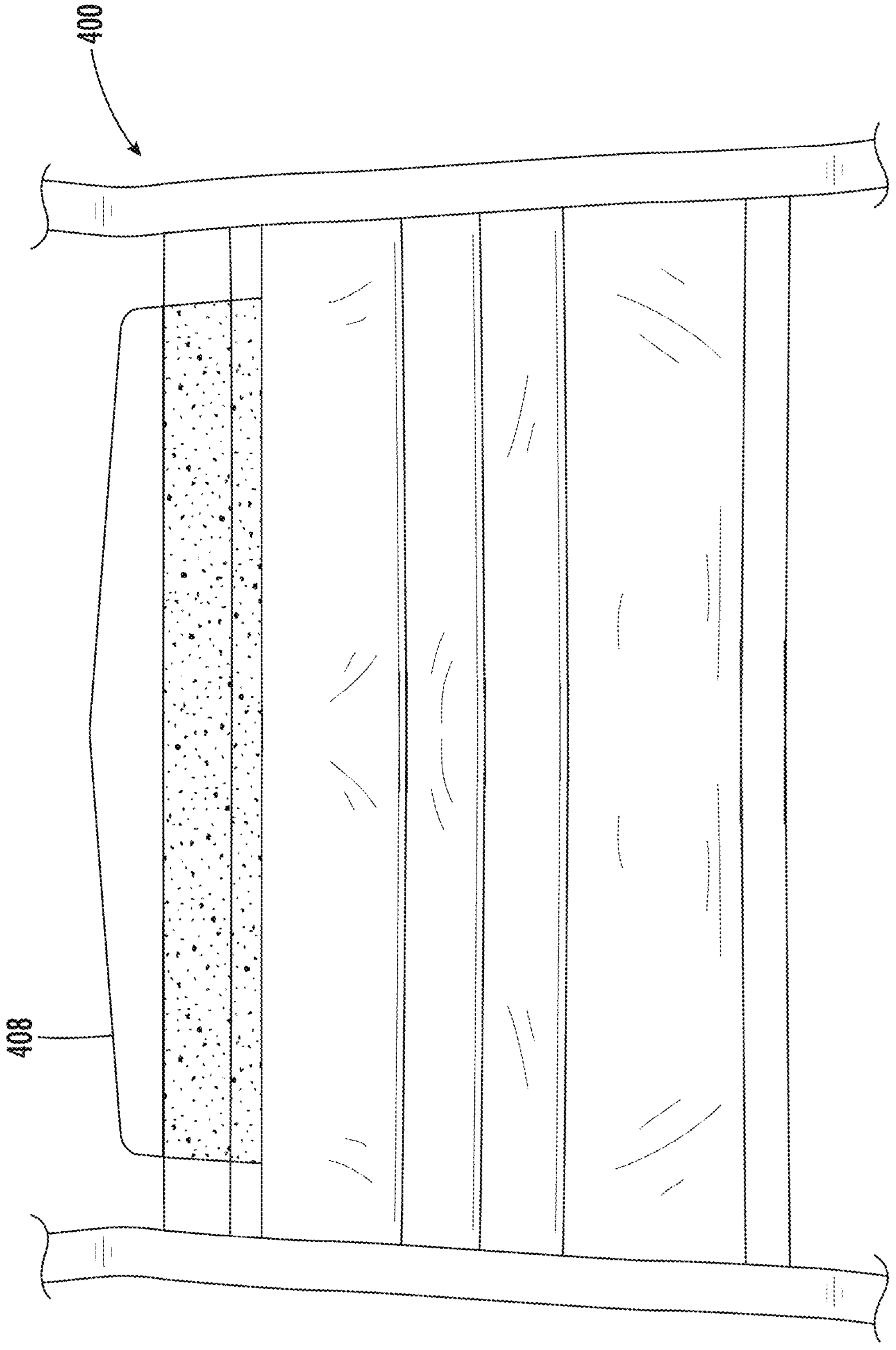
FIG. 4B is a back view of an exemplary improved adhesive PPE mask according to the present disclosure.
Figure 4C:
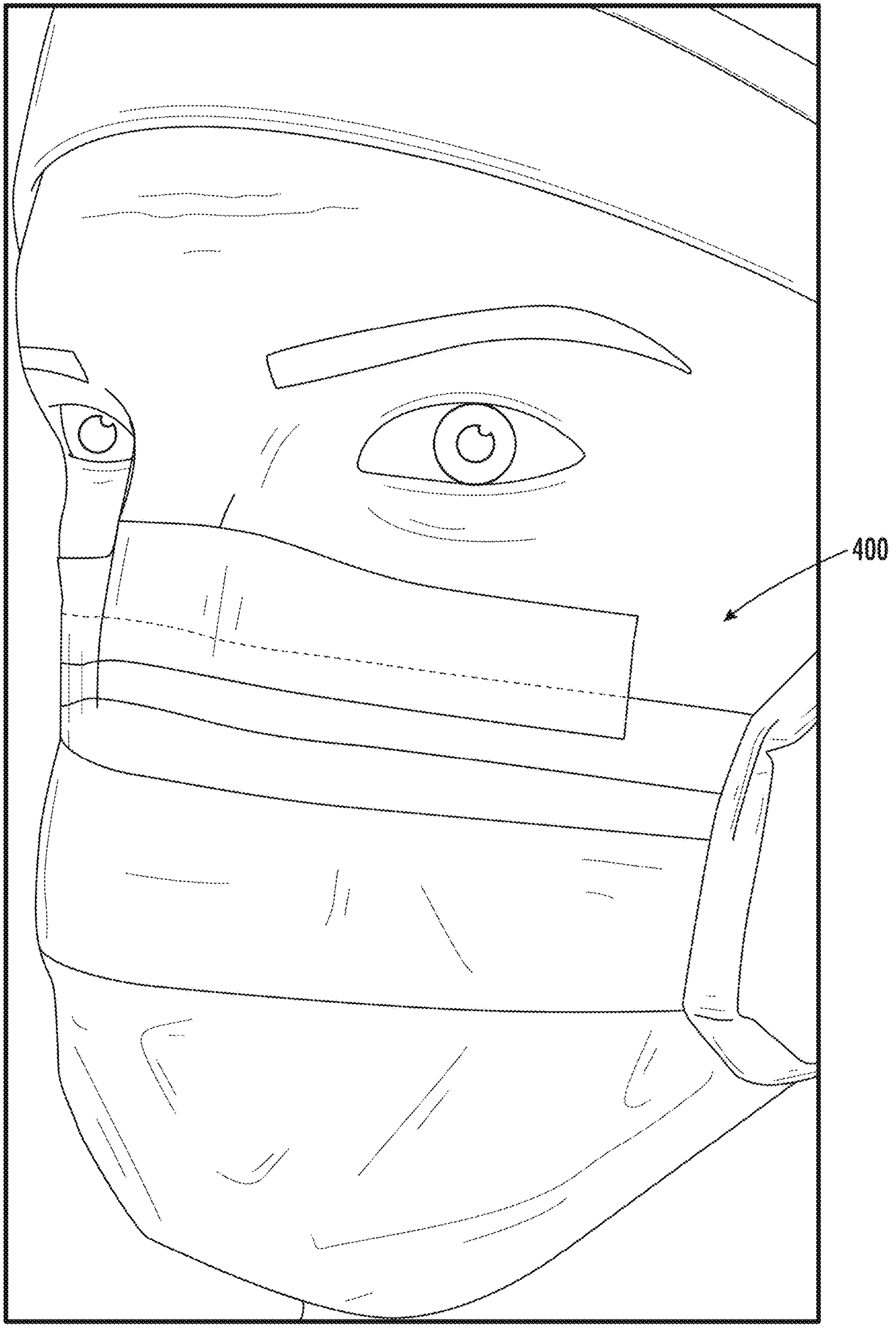
FIG. 4C is a front view of a wearer of an exemplary improved adhesive PPE mask according to the present disclosure.

FIGS. 4A and 4B illustrate front and back views, respectively, of an additional embodiment of an improved adhesive mask 400. According to this embodiment, paper support tabs suspend the adhesive membrane which facilitates application of the mask. These tabs are removed as the adhesive layer is applied to the nasal and malar skin while avoiding adhesion to the delicate infero-periorbital skin. FIG. 4C is an image of a person wearing the exemplary improved adhesive surgical mask 400 according to the present disclosure. This embodiment demonstrates the assembly of mask 400 with film dressing strip 406. Additionally, 400 shows the ability of the film dressing to follow the faces' contours during movement of a typical user.

As shown, the mask 400 comprises a paper filtration mouth cover 402 having at least two fasteners 404, and a film dressing strip 406 coupled to an upper rim thereof. As discussed above with respect to the embodiment of FIGS. 3A and 3B, the film dressing 306, 406 may be uniquely contoured to the durable malar and lower nasal skin, while avoiding attachment to the delicate adjoining infero-periorbital skin (see e.g., FIG. 4C). Other advantageous features of the film dressing 406 will be discussed in greater detail below.

As shown, the mask 400 is configured to, when purchased, comprise one or more minimally adherent wax, paper, or other backings 408 which protect the adhesive surface of the film dressing. In this manner, the many masks 400 may be easily packaged and shipped without risk of attaching to one another or to shipping materials. The paper backing 408 is removed then the mask is placed on the face. Unlike any other currently available masks, the exemplary implementation described includes front protective tabs configured to "lift" automatically when applied to the nose, allowing easy removal when donning the mask. The front backing is shaped differently, in one embodiment, in an effort to contour the nose. Additionally, a plastic liner separate from the paper backing 408 may be provided.

Figure 4D:
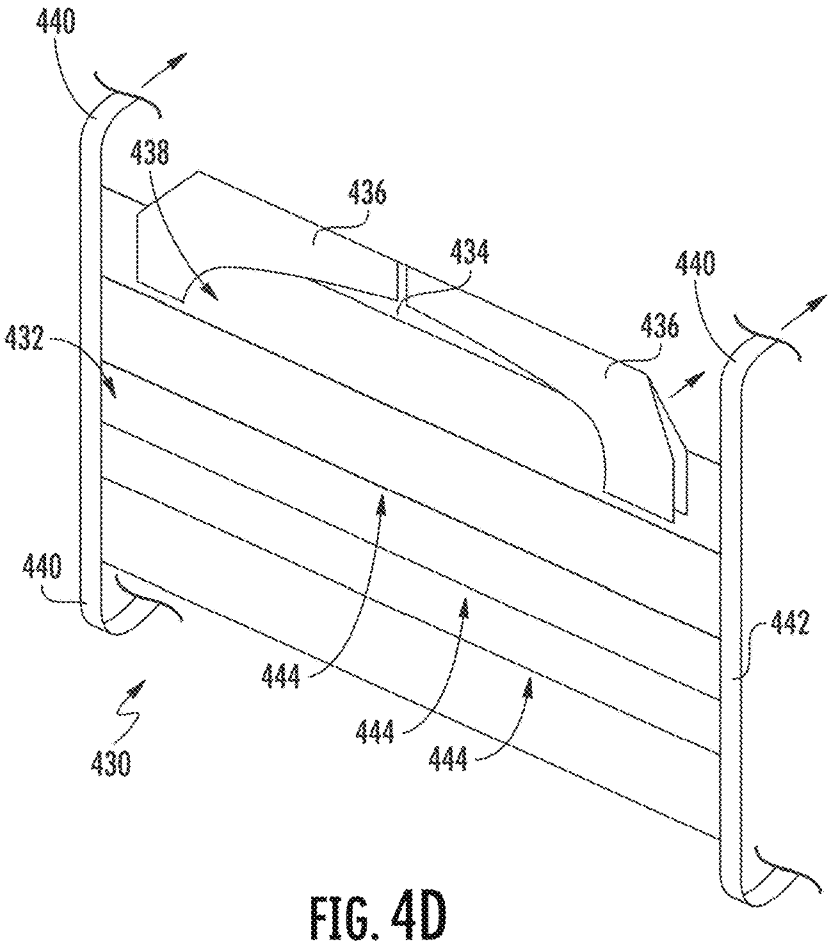
FIG. 4D is a front perspective view of a wearer of another exemplary embodiment of a mask apparatus according to the present disclosure.
Figure 4E:
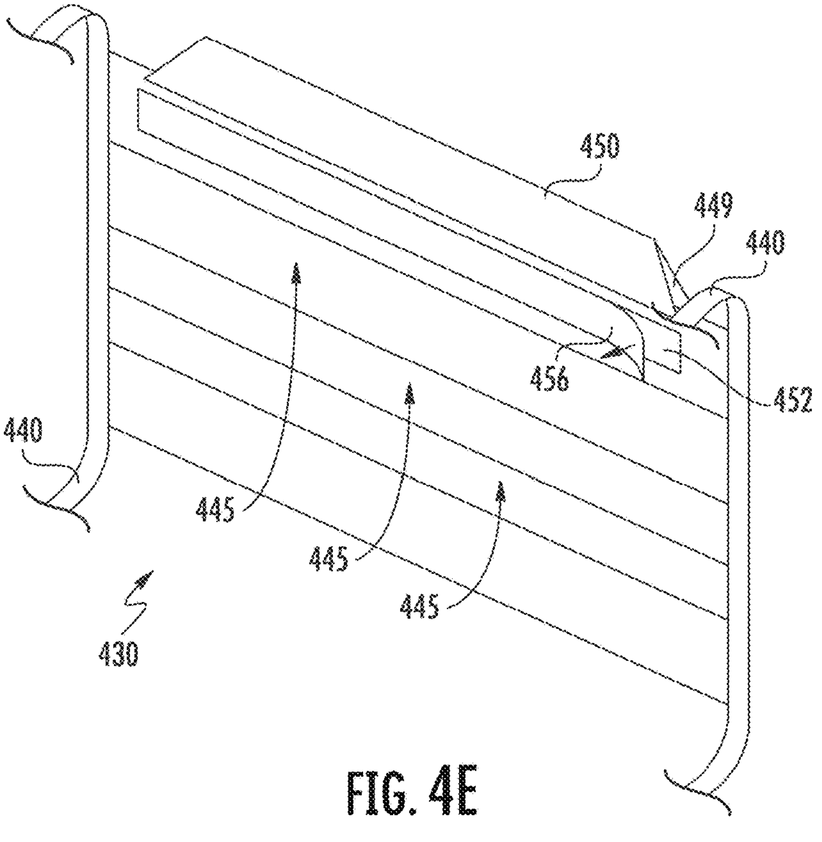
FIG. 4E is a rear (wearer-side) perspective view of the mask apparatus of FIG. 4D.

FIGS. 4D and 4E illustrate yet another embodiment of mask of the present disclosure. In this embodiment, the mask 430 (FIG. 4D) comprises a generally planar paper-or fiber-based filtration portion 432, upper and lower ties or straps 440 on each side connected by respective sidebars 442 (which may all be one continuous piece as shown, or discrete components), and an adhesive strip 434 which at least partly overlays an upper portion 438 of the filtration portion 432 (and which is adhered thereto via adhesive on the back side of the strip 434). Two waxed-backing removable tabs 436 cover respective left and right sides of the front, upper portion of the strip 434; these two tabs enable a wearer to, after the adhesive (rear) side of the strip 434 has been exposed as described further infra, press down on the front side of the tabs 436 with their fingers to firmly seat the adhesive of the strip 434 against the user's facial tissue. Once the mask is set and adhered, the two tabs 436 can simply be peeled up and removed, thereby exposing the front side of the strip 434.

As shown in FIG. 4D, the filtration portion 432 also includes a series of louvers or folds 444 which run laterally across the front of the mask 430 (as well as the back, in inverted configuration 445, as shown in FIG. 4E). The louvers 444, 445 maintain filtration integrity consistent with the rest of the filtration portion 432, yet also provide other benefits, which may include without limitation increased effective filtration surface area, shielding or "hiding" of portions of the filtration portion 432 from direct impingement from external fluids or contaminants, and mechanical flexibility (e.g., the folds can "billow out" to some degree to accommodate features of the wearer's face).

The back (wearer) side of the mask 430, as shown in FIG. 4E, includes the adhesive side of the strip 434 with adhesive 449 (shown partly exposed as the back-side backing 450 is pulled away before use), as well as a complementary lower adhesive strip 452 and associated backing 456. The two adhesive portions 449, 452, when exposed, adhere to the malar and other facial tissues of the user, again minimizing or even eliminating contact with sensitive periorbital tissue.

Figure 6A:
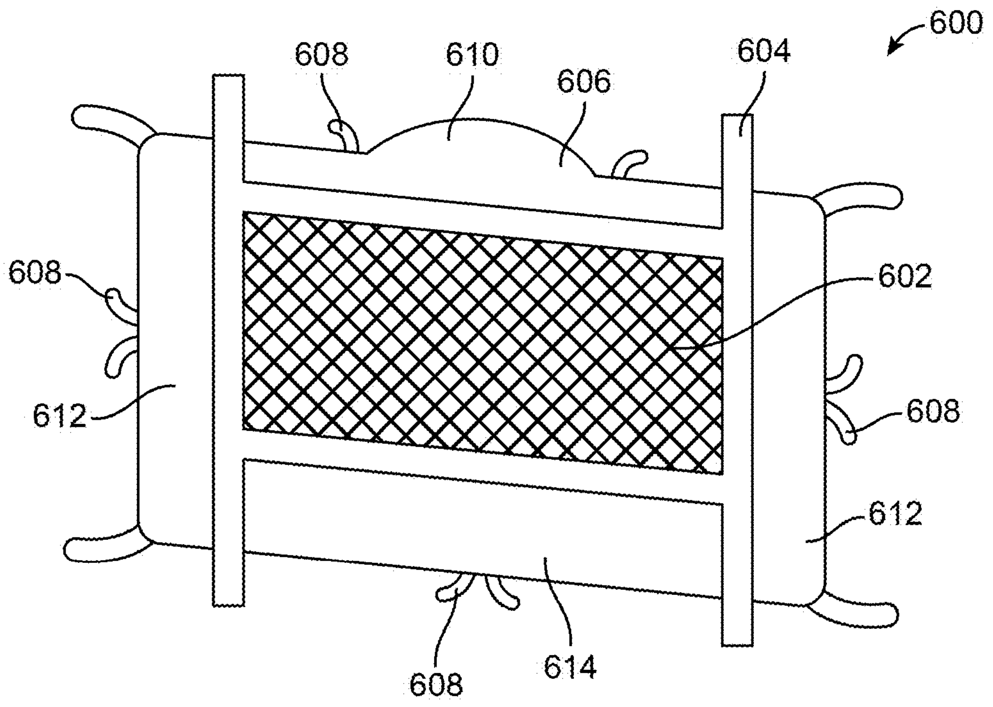
FIG. 6A illustrates a front perspective view of an exemplary improved adhesive PPE mask according to the present disclosure.
Figure 6B:
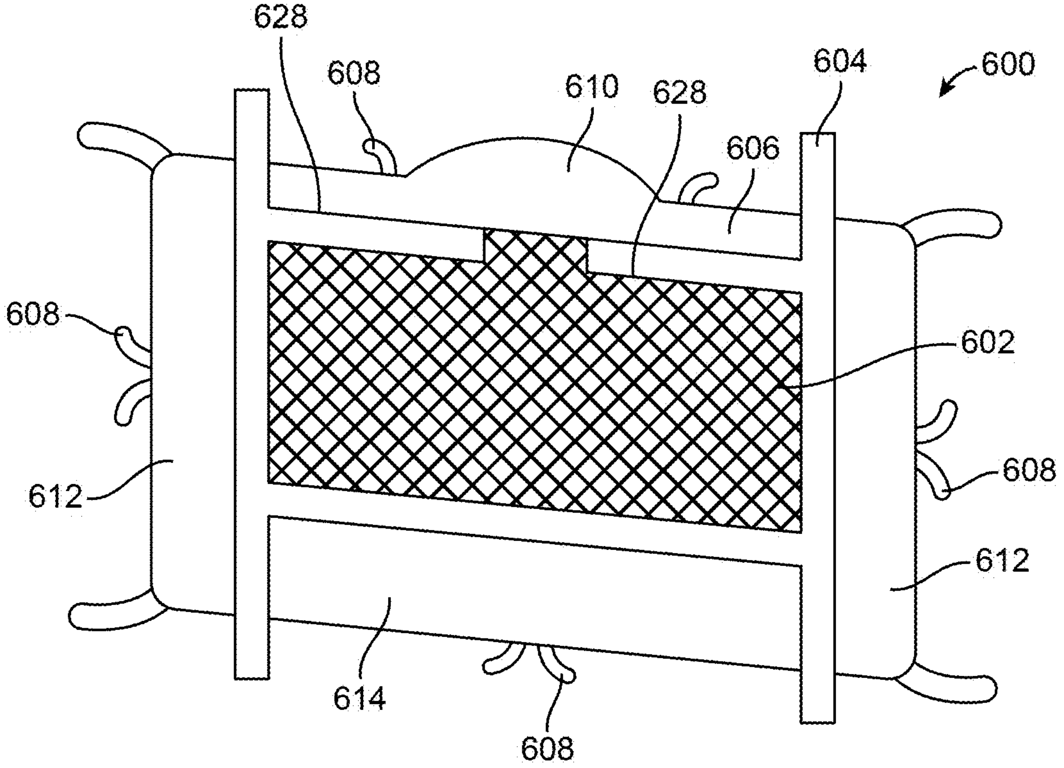
FIG. 6B is a front perspective partial cutaway view of an exemplary improved adhesive PPE mask according to the present disclosure, showing one or elements internal thereto.

Turning now to FIGS. 6A-6B, front views of an additional embodiment of an exemplary improved adhesive PPE mask 600 and an exemplary improved adhesive PPE eye shield 616 according to a second implementation of the present disclosure are given. As shown, the mask 600, similar to masks 300 and 400, generally comprises a paper-based filtration portion 602, one or more fasteners 604, and a superior anatomically shaped film dressing portion 606 configured to engage with skin in nasal and medial malar regions of the wearer's face. Differently from masks 300 and 400, mask 600 further includes lateral film dressing portions 612 configured to engage with skin in anterior malar and/or facial regions and an inferior film dressing portion 614 configured to engage with skin in and/or proximal to the mental region of the wearer's face. The embodiment of FIG. 6A also includes (as depicted in FIG. 6B) metal tabs 628 disposed within the mask (i.e., below the outer paper layer (s)) and configured to bend, in order to shape the mask to the face of the user.

As described above in reference to mask 300, 400, the paper filtration portion 602 is a semi-permeable paper barrier used to guard against transmission of germs (and other agents or substances) via the mouth. The fasteners 604 of the illustrated embodiment comprise four paper strings which are intended to be secured around the wearer's head, such that the top two strings are pulled above the wearer's ears and joined together, and the bottom two strings are pulled below the wearer's ears and joined together. It is appreciated however, that any number and type of fasteners may be utilized with equal success. For example, the fasteners may comprise Velcro®, bendable or flexible wire, elastics, etc.

The extremely thin and flexible film dressing portions 606, 612, and 614 have a coefficient of friction and pliability similar to the facial skin which eliminates the disruptive shear effect compromising the seal in traditional paper masks. The previously unrecognized advantage of utilizing a film dressing, most notably in the present context, is that this material is configured to adjust comfortably to the skin of the wearer as he/she moves (such as to talk, make facial expressions, etc.). Additionally, film dressing is specifically designed to remain adherent to the skin for extended periods despite perspiration. Other advantageous features of film dressings 606, 612, and 614 will be discussed in greater detail below.

Figure 6C:
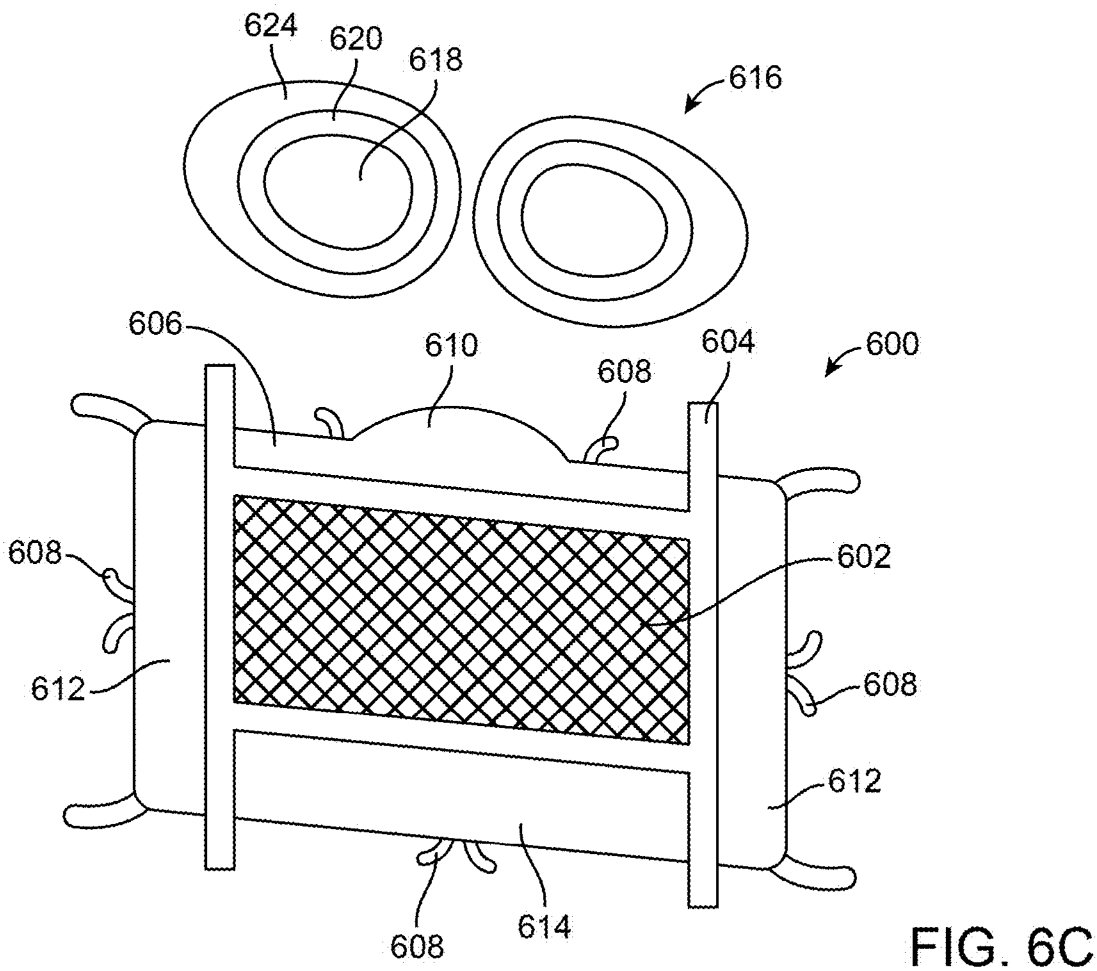
FIG. 6C is a front perspective view of exemplary improved adhesive PPE facial wear according to the present disclosure, including an exemplary mask and eye shields.

As illustrated in FIGS. 6A-6C, in one exemplary embodiment, the film dressing 606 is specifically shaped to accommodate the shape and curvature of a wearer's face, particularly when coverage of the face and overlap with eye shielding PPE is desired. Differently from film dressing 306, in the illustrated embodiment, the film dressing portion 606 comprises a continuously curved extension or flap 610 which is intended to conform to the wearer's nasal bridge. In this manner, the two portions of the film dressing 606 on either side of the extension 610 are of sufficient height so as to be affixed just below the infero-periorbital skin of the wearer. Additionally, the extension 610 is of sufficient height to accommodate overlap with a PPE eye shield. In a further embodiment, the film dressing 606 may further comprise a raised section and/or extension, of any geometric shape (including e.g., a flat strip, a flat strip having slits, more than one extension, etc.), which aides in contouring to facial anatomy.

Also similar to masks 300 and 400, the mask 600 comprises one or more mask removal tabs 608. As illustrated in FIGS. 6A-6C, the mask 600 includes removal tabs 608 not only at the superior film dressing portion 606, but also at an edge of each of film dressing portions 612 and 614. The exemplary mask removal tabs 608 simplify removal of the mask without irritation to the delicate skin (e.g., infero-periorbital skin). The removal tabs 608 assist in the removal of the adhesive dressing from the users malar, nasal, and mental skin, and are shaped to allow the user to feel for the tabs, without the need to look in a mirror or utilize another person to guide them. In this manner, the wearer is not required to make any abrasions to the skin (such as by scratch at the interface of the dressing and the skin to pull up an edge or corner), and the tabs can be used even if the wearer or other person removing the mask has no exposed nail or otherwise has insufficient dexterity to "peel up" the edge of the adhesive as required in some prior art apparatus.

Figure 6D:
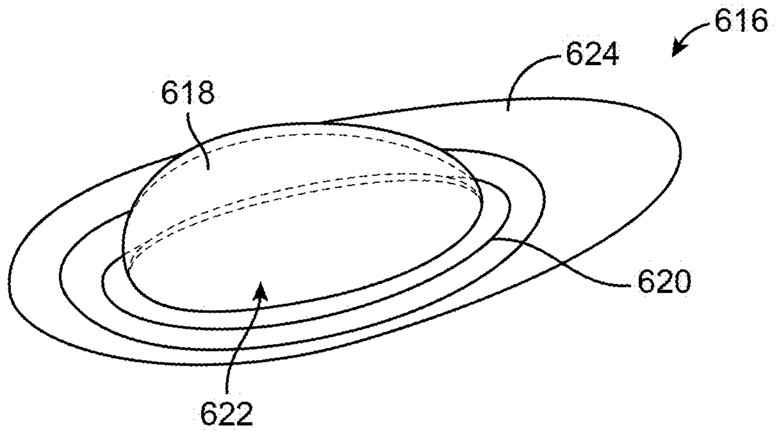
FIGS. 6D-6E are front and side perspective views, respectively, of an exemplary improved adhesive PPE eye shield according to the present disclosure.
Figure 6E:
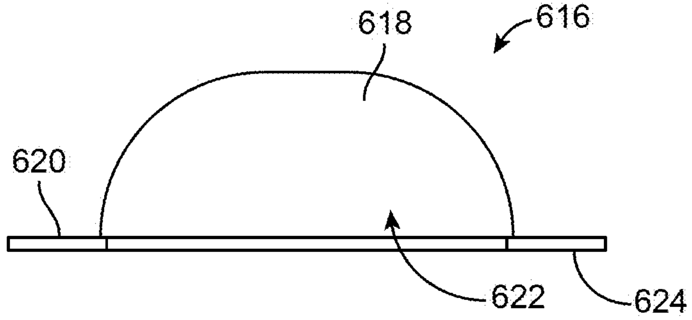

FIGS. 6C-6E depict an exemplary embodiment of PPE eye shields 616 which can be used alone or in combination with a mask. Although FIG. 6C shows eye shields 616 in combination with mask 600, it will be appreciated that the eye shields can be used alone, in combination with the mask 300, the mask 400, or another PPE mask and/or equipment (e.g., hood, face shield, etc.). It is also appreciated that while shown as two substantially discrete elements (i.e., one for each of the wearer's eyes), the individual eye shields can be aggregated into a single, common apparatus or assembly if desired, with suitable flexibility and conformability to the user's face substantially maintained thereby.

The eye shields 616 include a raised window portion 618 having a generally a half ellipsoid shape which is configured to be placed over an eye and later periorbital skin of a wearer. A lip or edge 620 disposed on a perimeter of the window 618 is laterally extended outward from the window perimeter.

The window 618 in the illustrated embodiment is transparent or semi-transparent to permit viewing through the eye shield, while being at least partly impermeable to liquids, gases, microbes, and/or particulate matter. For example, the degree of permeability of any may be determined by the particular application; the present disclosure contemplates that there may be instances where some degree of inward or outward permeability to, e.g., certain molecular species, may actually be desired. Likewise, not every application may require effectively zero permeability, and hence the cost, thickness, etc. of the windows 618 can be reduced accordingly.

In some alternative examples, the eye shield may be at least partly opaque and limit the passage of light to the eye, and conceivably may also incorporate e.g., photo- and/or thermally sensitive materials such that opacity varies as a function of exposure to solar radiation, heat. In some implementations, the window may be clear, tinted, dichroic, and/or polarized. Additionally or alternatively, in some examples, the window may include a coating, such as a fog-resistant coating (e.g., on the interior surfaces), a UV-blocking coating, a scratch resistant coating, etc. The window 618 may also optionally be adapted for various degrees of magnification for the user's eye, e.g., with cost-effective inclusion of a "bifocal" or similar portion such that the user, in adjusting their gaze and/or head position, can be provided some degree of magnification through the windows.

Further, the window 618 and the lip or edge 620 are in one variant comprised of a generally more rigid material in order to, inter alia, retain a protective or invariant eye space or void 622 (e.g., for ballistic protection, to prevent the deformation of the window when wiping their face, and the like). Accordingly, the window and/or the lip or edge may be fabricated from glass, plastic, resin, polycarbonate, and/or any other suitably rigid material known or yet to be discovered.

Further, the window and the lip or edge can be one co-molded piece (e.g., for cost and ease of manufacturing), or they can be separate adhered or otherwise attached pieces. Thus, in some examples, the lip or edge and the window can be comprised of differing materials and/or materials with differing properties (e.g., opacity, transparency, coatings, etc.).

As illustrated in FIGS. 6C-6E, each eye shield 616 further includes a film dressing portion 624 adhered to or otherwise attached to lip or edge 620. Akin to that used for the exemplary mask described elsewhere herein, the extremely thin and flexible film dressing portion 624 has a coefficient of friction and pliability similar to the facial skin which eliminates the disruptive shear effect compromising the seal in traditional eye shields (e.g., goggles). The previously unrecognized advantage of utilizing a film dressing, most notably in the present context, is that this material is configured to adjust comfortably to the skin of the wearer as he/she moves (such as to talk, make facial expressions, etc.). Additionally, film dressing is specifically designed to remain adherent to the skin for extended periods despite perspiration. Other advantageous features of the film dressing 624 will be discussed in greater detail below.

The exemplary film dressing 624 is also specifically shaped to accommodate the shape and curvature of a wearer's face. In the illustrated embodiment, the film dressing portion 624 comprises a generally elliptical shape which is intended to conform to the wearer's skin in the malar and sincipital regions. In this manner, the film dressing 624 is of a sufficient height so as to be affixed to the wearer's skin above the supraorbital region (at a superior region of the film dressing 624), and optionally overlap at least a portion of the film dressing 606 of the mask 600 (at an inferior region of the film dressing 624). Additionally, the film dressing 624 may cover skin in the region of the wearer's nasal bridge (at a medial region of the film dressing 624) and may cover skin in the anterior orbital region (at an anterior region of the film dressing 624). In a further embodiment, the film dressing 624 may further comprise sections of any geometric shape, which aide in contouring to facial anatomy and/or the film dressing 624 may additional include removal tabs, such as the removal tabs 308, 608 described above.

It will be appreciated that the exemplary film dressing 624 substantially seals around one eye of the user, thereby limiting permeability of liquids, gases, microbes, and/or particulate matter at the perimeter of the eye shield 616. During normal use, two eye shields 616 are used (as depicted in FIG. 6C) for covering each of the left and right eyes of the user. As such, the film dressing 624 preferably overlaps at the anterior regions of the eye shields when worn by the user. In some alternate examples, in order to increase comfort of wear for the user, the window and/or lip edge portions can include one or more one-way "vents" (e.g., perforations within the window 618 or other component which allow air (and moisture) to flow only outward from the interior region), to allow humid air to escape the sealed protective eye space while limiting permeability of liquids, microbes, and/or particulate matter. For instance, the present disclosure contemplates use of an anti-fog coating of the type used on other vision or glass apparatus, such as on the interior surface of the eye shield lens. As another alternative, a one-way valve can be used for such purpose. As yet a further alternative, dry air can be pumped into the void space between the user's face and the shield(s) so as to create a slight positive pressure therein, and force any moisture (e.g., vapor) therein out through the one-way valve. Such air can be pumped in using e.g., a small-diameter flexible tube (e.g., Tygon or the like) routed through a sealed perforation or seam of the shield(s), and supplied by e.g., a miniature air pump with dehumidifier, or even a small fan, with e.g., (ingress) microbe filter.

Moreover, a miniaturized electronic device such as those operating under the Peltier Effect (i.e., a temperature difference created by applying a voltage between two electrodes connected to a semiconductor material) may be used consistent with the apparatus of the present disclosure for e.g., dehumidification. In one such approach, a miniature Peltier cooler or dehumidifier device is places such that its active surface is at least partly in contact with a humid airspace (e.g., interior of eye shields) such that condensation generated thereby is able to "drip" out a channel or other conduit so as to permit the egress of moisture.

As yet another alternative, the eye shields may each include one or more "ports" disposed around the periphery thereof which facilitate the egress of moist/humid air within the interior volume of the eye shield to dissipate to the environment (and hence, inter alia, reduced or eliminated "fogging"). In one such implementation, a number of different ports are spaced around the periphery, and the ports are covered each by a portion of the aforementioned film dressing or other at least partly porous material or component, such that the moist air from within the eye shield(s) can permeate outward through the port and overlying film dressing, yet maintain a substantially sealed barrier against ingress of external contaminants. In another implementation, a substantially moisture-absorbent material (e.g., a thin layer of sponge-like material or similar) is used to cover the port(s) so as to permit the absorption of the moisture within the eye shield. Moreover, it will be appreciated that such absorbent material may be used alone (i.e., without the aforementioned ports), such as on or within a peripheral interior surface of the eye shield (e.g., this strips of the sponge-like material) which absorb moisture yet do not appreciably occlude the visibility of the wearer).

In other alternate examples, the left and right eye shields can be connected via a single film dressing sheet (substantially forming a PPE eye mask).

It will be appreciated that while human faces are generally somewhat similar in the region of interest (i.e., area of nose, bridge, periorbital regions, malar regions, mental regions, etc.), significant variations from individual to individual may exist, including variations in dimensions, angles, textures, and other features which may affect the performance (and requisite configuration) of the mask described herein. Moreover, the transition of skin types may occur at different areas, and other differences may exist.

Accordingly, while the exemplary embodiments of the mask and the eye shield described herein advantageously can generally adapt to such variations (e.g., through use of the aforementioned film dressing), the present disclosure also contemplates the creation of user-customized masks and/or eye shields which are particularly adapted to the wearer. For example, in one implementation, a 3D model of the relevant portions of the user's face (such as via a laser or optical scan of the wearer's face) is created, and this information used to particularly adjust one or more aspects of the mask construction. Hence, user-specific lots of masks, such as for surgeons who routinely wear them, can be fabricated and provided (including e.g., labeling such as a colored dot or printed name on the mask front, which can be used to identify the proper mask for a given individual).

Figure 7A:
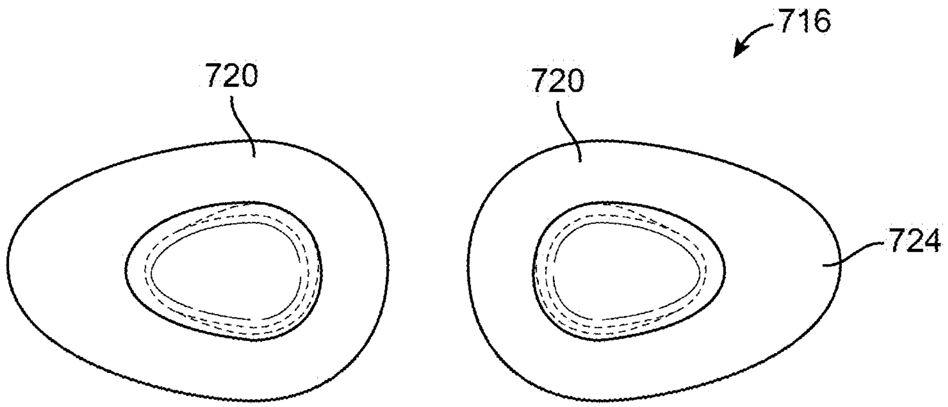
FIG. 7A is front perspective view of exemplary improved adhesive PPE right and left eye shields according to the present disclosure.
Figure 7B:
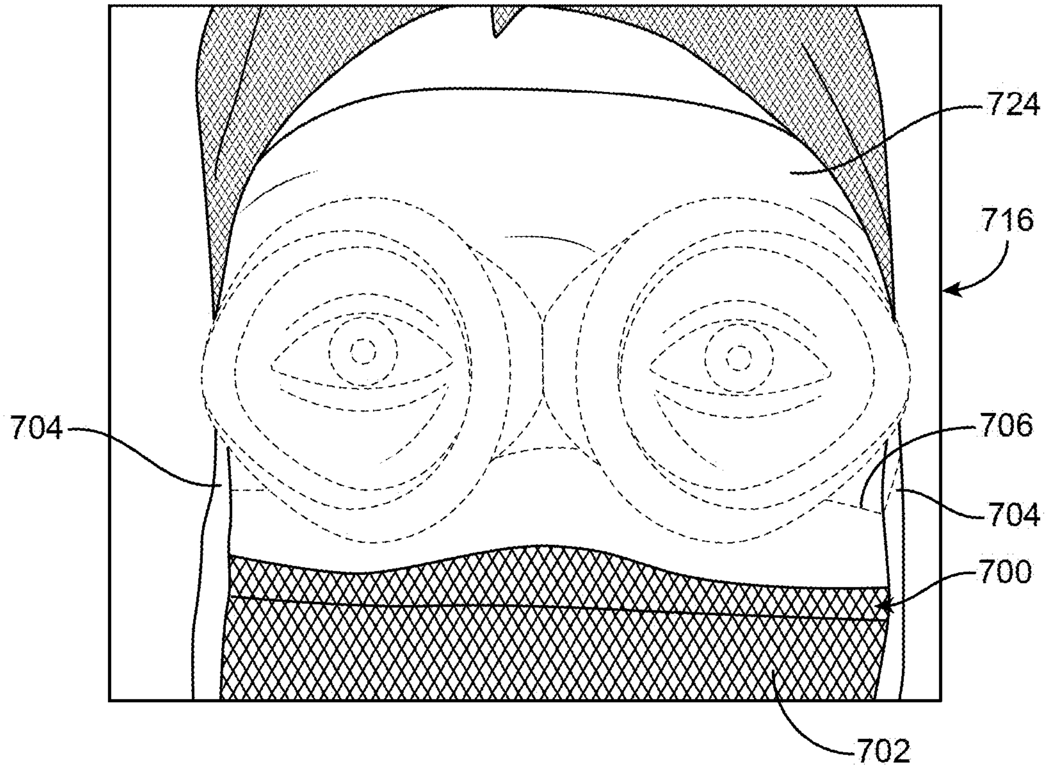
FIG. 7B is front perspective view of a wearer of an exemplary improved adhesive PPE facial wear article according to the present disclosure, showing the disposition thereof during normal use.

FIGS. 7A and 7B illustrate front views of an additional embodiments of an improved adhesive PPE mask 700 and an improved adhesive PPE eye shield 716. As shown in of FIG. 7A, paper support tabs suspend the adhesive membrane which facilitates application of the eye shields. These tabs are removed as the adhesive layer is applied to the nasal, malar, and sincipital skin while avoiding adhesion to the delicate infero-periorbital skin. FIG. 7B is an image of a person wearing the exemplary improved adhesive PPE mask 700 and PPE eye shield 716 according to the present disclosure. This embodiment demonstrates the assembly of the eye shields 716 with film dressing portions 724 and supportive lips or flanges 722. Additionally, FIG. 7B shows the ability of the film dressing to follow the faces' contours during movement of a typical user. It will be appreciated that, although not specifically shown, mask 700 can additionally include paper or other types of support tabs (such as those shown in FIGS. 4A and 4B).

As can be seen in FIG. 7B, the mask 700 comprises a paper filtration mouth cover 702 having at least two fasteners 704, and a film dressing strip 706 coupled to an upper rim thereof. As discussed above with respect to the embodiment of FIGS. 6A-6C, the film dressing 606, 706 may be uniquely contoured to the durable malar and upper nasal skin, while avoiding attachment to the delicate adjoining infero-periorbital skin and overlapping with the film dressing 724 (see e.g., FIG. 7B).

As shown, the eye shields 716 are configured to, when purchased, comprise one or more minimally adherent wax, paper, or other backings 720 which protect the adhesive surface of the film dressing. In this manner, the many eye shields 716 may be easily packaged and shipped without risk of attaching to one another or to shipping materials. The paper backing 724 is removed then the eye shield is placed on the face. Additionally, a plastic liner separate from the paper backing 724 may be provided.

The masks 300, 400, 600, and 700, as well as eye shields 616 and 716, of each of the foregoing embodiments is applied simply without compromising or augmenting natural nasal valve air flow, and is atraumatically removed without skin residue. The various film dressing strips seals the mask 300, 400, 600, and 700 from respiratory vapor escape, avoiding fogging of any glass devices including microscopes, endoscopes, loupes, personal corrective lenses, glasses, eye shields, and/or goggles. Throughout its use, the mask and the eye shields are comfortable due to the light weight, and remains adherent due to the naturally flexible nature of the film dressing.

In a further embodiment (not shown), the film dressing may be bonded or fused to a foam pad so as to provide further comfort to the wearer. The foam pad in one embodiment is adhered to the top edge and comfortably rests against the user's malar and nasal skin. The film dressing, on the outside of the mask's top edge then seals the mask from the release of warm air. The pad can also be made to be substantially moisture absorbent, so as to assist in absorption of the user's perspiration and/or exhaled breath moisture.

The improved mask 300, 400, 600, 700 and/or eye shields 616, 716 of the present disclosure is, in one embodiment, manufactured of materials which are disposable or sufficient for only a single use. Accordingly, in another variant, one or more portions of the mask and/or eye shields can be made to indicate, upon use by the user, that the mask or eye shield has been worn (so as to, e.g., prevent a user from reusing it inadvertently). In one implementation, the mask and/or eye shields includes a small amount of moisture-reactive chemical or dye present in the filter portion such that, when appreciable moisture from the user's breath or perspiration comes in contact therewith, at least a portion of the mask or eye shield turns a different color than its surroundings, so as to be readily noticed by the (prospective subsequent) user. Yet other approaches may be used, including other types of chemical reactions, timed decay or dissolution of a portion of the mask or eye shield (e.g., the adhesive is rendered useless after exposure to a prescribed temperature for a given period of time, a moist/dry cycle, etc.).

As can be seen given the embodiments and discussion above, the improved mask 300, 400, 600, 700 and eye shields 616, 716 are easily applied and removed without skin trauma or adhesive residue. Specifically, the film dressings 306, 406, 606, 706, film dressing 612 and 614, and film dressing 624, 724 are comprised of a material which is removed easily and which does not leave such residue. Moreover, the film dressing portion 306, 406, 606, 706 of the mask 300, 400, 600, 700 is anatomically designed to adhere only to the malar and nasal skin, and to avoid contact with the delicate infero-periorbital tissue.

As noted above, the film dressing portion 306, 406, 606, 706 and film dressing 624, 724 advantageously enables an airtight seal to be created while still ensuring that the wearer's nasal valve remains fully open and unobstructed. In certain embodiments, the mask 300, 400, 600, 700 and/or eye shields 616, 716 can further be configured such that an outward bias on the user's outer nasal area skin can be created when wearing the mask or eye shields, thereby in effect further expanding at least the inner nasal valve (and enhancing nasal air flow as compared to a normal static (unbiased or uncompressed) state), somewhat akin to the known Breathe Right® strips currently commercially available. Specifically, in one variant, the film dressing portion itself can be configured with a slightly reduced degree of flexibility in at least the area spanning the sides and bridge of the nose, such that when adhered to the user's skin in those areas, the combination of the reduced flexibility or "springiness" (i.e., tendency to straighten out to a more flat, planar shape when bent) and adhesive will cooperate to bias the outer nasal tissue outward (and hence further open the internal nasal passages/valve). This reduced flexibility can be accomplished by, e.g., making the film dressing significantly thicker in the region proximate the nose, and/or adding a strip or other mechanism to enhance the aforementioned springiness (such as by adhering a thin plastic strip to the outer portion of the film dressing).

In another variant, a plastic or other material strip, rod or other shape is embedded in or mated to a region of the superior portion of the mask around the user's nose (as in the example shown in FIG. 6B), thereby providing the aforementioned outward bias or "springiness". This feature can be configured such that the outward bias does not cause any significant stress on or separation of the film dressing from the user's facial tissue in the malar region, under the eyes, etc., thereby fully preserving the full sealing function of the mask described supra, as well as the aforementioned expansion of the nasal valve and accompanying enhanced air flow.

It is further noted that the film dressings 306, 406, 606, 706, film dressing 612 and 614, and film dressing 624, 724 of the herein described improved mask 300, 400, 600, 700 and eye shields 606, 716 facilitate normal facial expression and perspiration by creating a flexible adhesion thereto which does not loosen or shift during wear, even over extended operative periods lasting many hours. This durability prevents the need for a user to "break sterility" by "scrubbing out" in order to apply a new PPE mask and/or eye shield. Moreover, the described film dressings are resistant to the accumulation of perspiration due to the nature of its integral skin seal. Accordingly, the wearer of the mask 300, 400, 600, 700 and/or eye shields 616, 716 discussed herein do not waste time adjusting or replacing slipping or loosened masks and eye shields.

Exemplary Methods—

The improved masks 300, 400, 600, 700 and eye shields 616, 716 of the present disclosure are used according to the following methods.

Specifically, in regards to masks 300, 400, 600, 700, a wearer first removes a protective backing 408 from the film dressing 306, 406, 606, 706. The contoured 310, 610, 710 dressing is placed on the bridge of the wearer's nose and smoothed to lie flat against, and therefore adhere to, the durable malar and lower nasal skin, while avoiding attachment to the delicate adjoining infero-periorbital skin. Thus, the superior edge of the mask is at least partially sealed to the wear's skin. In the example of mask 600, 700, protective backings are removed from lateral film dressings 612 and inferior film dressing 614 and the film dressings are applied to and smoothed to lie flat against, and therefore adhere to, the anterior malar skin and mental skin regions, respectively. In this example, the periphery of the mask is at least partially sealed the lateral edges and inferior edge of the mask in addition to the superior edge of the mask.

Next, the fasteners are coupled, fastened, placed into contact, or otherwise activated to secure the remaining air-filtration portion around the wearer's head. In some embodiments, where the mask includes a film dressing edging which surrounds the entire mask (such as the configuration of the mask 600 shown in FIGS. 6A-6C), the fasteners may be excluded. Hence, in this embodiment, the mask may be worn by simply removing a protective backing and affixing the mask directly to the skin.

After the mask is secured, eye shields 616, 716 may be applied. Specifically, the wearer first removes a protective backing 720 from the film dressing 624, 724. Next, the window 618, 718 is aligned with one of the wearer's eye and the surrounding film dressing 616, 716 is applied to and smoothed to lie flat against, and therefore adhere to, the wearer's skin above the supraorbital region (at a superior region of the film dressing 624, 724) and overlap at least a portion of the film dressing 306, 406, 606, 706 of the mask 300, 400, 600, 700 (at an inferior region of the film dressing 624, 724). In the present example, the film dressing 624, 724 additionally covers skin in the region of the wearer's nasal bridge (at a medial region of the film dressing 624, 724) and in the anterior orbital region (at an anterior region of the film dressing 624, 724). It will be appreciated that a second eye shield 616, 716 may be dawned in a substantially similar manner over the wearer's other eye. In some examples, the film dressings 624, 724 of adjacent eye shields will at least partially overlap at the nasal bridge and medial sincipital regions of the user's skin. In examples where the left and right eye shields are attached in a single film dressing sheet, both eye shields may be concurrently applied in a substantially similar manner.

To remove the mask and/or eye shields, a wearer may first unfasten the one or more fasteners such as by untying, cutting, ripping, pulling apart, or stretching these away from one another and/or away from the head of the user to create a space large enough for the user's head to escape. Next, an edge of one or more of the various film dressings of the mask (the film dressing 306, 406, 606, 706, and/or film dressings 612 and 614) is grasped in order to pull the dressing away from the user's skin. In some examples, the removal tabs 308, 608 are grasped to aid in pulling the dressing away from the user's skin. Further, in some examples, the film dressing 624, 724 is at least partially overlapping with the film dressing 306, 406, 606, 706, the eye shields 616, 716 may be pulled away from the user's face along with the mask. In other examples, an edge of the film dressing 624, 724 may be grasped to facilitate removal of one or more of the eye shields from the wearer's face.

As noted above, the above described film dressings do not leave a residue and do not adhere so firmly to the skin so that removal is traumatic to the skin. Therefore, the detachment is generally accomplished without causing significant impact to the wearer's skin. As noted above, the mask 300, 400, 600, 700 and eye shields 616, 716 may be comprised primarily of disposable materials, and therefore may be discarded after removal.

Film Dressing—

In one specific embodiment, the various film dressing portions discussed herein comprises a dressing having properties generally similar to extant wound or other dressings, such as for example the 3M™ Tegaderm™ Dressing; however other types of dressing may be utilized with equal success, given that they provide similar performance in terms of flexibility and resistance to perspiration. Similar dressing products are available from McKesson's Transparent Dressing and Medline's Suresite Window Transparent Film Dressing).

In one exemplary implementation, the "film dressing" utilized with various embodiments described herein comprises a multi-layer (e.g., two layer) laminate structure, having for instance a substrate and an adhesive. It will be appreciated, however, that various different configurations may be utilized, including without limitation, (i) ones where the adhesive is deposited on or bonded to the host substrate; and (ii) ones where the adhesive itself actually forms the substrate. Moreover, various degrees of permeability to e.g., humidity, air, etc. are contemplated.

One or more of the various film dressing portions may further comprise an anti-microbial layer and may, in one embodiment, be transparent. Further, the various film dressings comprises a breathable material which is configured to enhance moisture evaporation and adhesiveness of the dressing to the skin. Hence, it remains adhesive despite sweating and natural movement of the skin and muscles of the wearer.

It will also be appreciated that one or more film dressings, such as those described above, may be used on other regions of the mask/filter component, such as on the sides. For example, in one variant, the sides of the mask filter 302, 402 (and in fact, the whole of the filter) can be shaped so as to optimize bonding to the sides of the user's face via respective film dressings, so as to at least partially "seal" the sides of the mask as well. In one exemplary configuration, the mask filter is performed so as to be "cupped" substantially around the user's face (versus being substantially planar prior to application, as shown with respect to the embodiments of FIGS. 3A-3B, 4A-4B, and 6A-6C above), thereby causing the sides to lay generally flat against the sides of the user's face during use, and permitting attachment thereto directly using e.g., film dressings. Such embodiment may or may not further include additional fasteners as discussed in the embodiments given above.

Many other approaches and combinations are envisaged consistent with the disclosure, as will be recognized by those of ordinary skill when provided this disclosure.

Results—

Informal testing of various embodiments of the mask and eye shield(s) disclosed herein by the inventors hereof in situ (i.e., during one or more closed surgical procedures) indicate markedly improved performance of the disclosed mask and/or eye shielding equipment over the prior art, especially in terms of the above-described aspects of reduced "fogging" of optical equipment, comfort, and reduced/eliminated trauma upon removal, including over extended surgical procedures lasting many hours.

It should be recognized that while the foregoing discussion of the various aspects of the disclosure has described specific sequences of steps necessary to perform the methods of the present disclosure, other sequences of steps may be used depending on the particular application. Specifically, additional steps may be added, and other steps deleted as being optional. Furthermore, the order of performance of certain steps may be permuted, and/or performed in parallel with other steps. Hence, the specific methods disclosed herein are merely exemplary of the broader methods of the disclosure.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. The described embodiments are to be considered in all respects only illustrative and not restrictive. The scope of the disclosure is, therefore, indicated by the appended claims rather than the foregoing description. All changes that come within the meaning and range of equivalence of the claims are embraced within their scope.

What is claimed is:

1. A mask comprising:

an air-permeable portion configured to be placed over a mouth and nose of a wearer;

at least one strap which is configured to secure the mask to a head of the wearer; and an adhesive strip comprising a front side and a back side;

wherein:

the back side of the adhesive strip comprises an adhesive portion, a lower portion of the adhesive portion implemented to adhere to an upper portion of an outer surface of the air-permeable portion and an upper portion of the adhesive portion implemented to adhere to skin of the wearer;

the front side of the adhesive strip comprises an outward-facing portion, the outward-facing portion having two removable backing strips pressed thereon, a first one of the two removable backing strips covering a left-side of the front side of the adhesive strip and a second one of the two removable backing strips covering a right-side of the front side of the adhesive strip; and each of the two removable backing strips enable the wearer to press down on the front side of the adhesive strip to cause the implementation of the upper portion of the adhesive portion to adhere to the skin of the wearer.

2. The mask of claim 1, wherein:

the adhesive portion is configured to at least minimize contact with periorbital skin of the wearer when the mask is worn; and the minimization of the contact with the periorbital skin of the wearer when the mask is worn mitigates trauma to the periorbital skin of the wearer when the mask is removed therefrom.

3. The mask of claim 2, wherein the adhesive portion comprises an adhesive configured to release from any of the periorbital skin contacted thereby without trauma to the periorbital skin when the mask is removed.

4. The mask of claim 1, wherein the adhesive strip comprises a flexible film dressing having a coefficient of friction and pliability comparable to at least one of malar skin or nasal skin of the wearer, and a thickness of the flexible film dressing is selected so as to permit distortion thereof during normal facial movements of the wearer without causing loss of adhesion.

5. The mask of claim 1, wherein:

the adhesive strip extends above a top edge of the air-permeable portion;

the adhesive portion is configured to act as a moisture vapor barrier against breath of the wearer so as to avoid fogging of optical apparatus used by the wearer while wearing the mask; and the adhesive portion further comprises a depression formed therein, the depression configured to enable eyewear of the wearer to directly contact a bridge portion of the nose of the wearer.

6. The mask of claim 1, further comprising a first removable backing strip covering the back side of the adhesive strip;

wherein the mask is configured to be applied to the wearer by:

removal of the first removable backing strip covering the back side of the adhesive strip, thereby exposing the adhesive portion;

placement of the lower portion the adhesive portion onto the upper portion of the air-permeable portion;

pressing of the upper portion of the adhesive portion against a face of the wearer via use of the two removable backing strips; and removal of the two removable backing strips.

7. The mask of claim 1, wherein the two removable backing strips impart a degree of rigidity to the adhesive strip so as to enhance the adherence.

8. The mask of claim 1, wherein the first one and the second one of the two removable backing strips are configured to enable contouring of the two removable backing strips around one or more facial features of the wearer.

9. The mask of claim 1, wherein:

the air-permeable portion comprises a plurality of folds, the plurality of folds configured to enable mechanical flexibility of the mask; and the adhesive portion is disposed at least on a first one of the plurality of folds, the first one of the plurality of folds comprising a top edge of the mask.

10. A method of donning a mask having an air-permeable portion configured to be placed over at least a portion of a face of a wearer, and an adhesive strip, the adhesive strip comprising (i) a back side comprising an adhesive portion, wherein a lower portion of the adhesive portion is configured to adhere to an upper portion of the air-permeable portion of the mask and an upper portion of the adhesive portion is configured to adhere to skin of the wearer and (ii) a outward-facing front side, the outward-facing front side having at least one removable backing strip pressed thereon, the method comprising:

pressing on the at least one removable backing strip so as to cause adherence of the lower portion of the adhesive portion to the upper portion of the air-permeable portion;

placing the mask over the at least portion of the face while pressing on the at least one removable backing strip so as to cause adherence of the upper portion of the adhesive portion to the skin; and after the adherence of the adhesive portion to the skin, peeling off the at least one removable backing strip from the outward-facing front side of the adhesive strip.

11. The method of claim 10, wherein the at least one removable backing strip comprises first and second removable backing strips respectively covering left and right sides of the outward-facing front side of the adhesive strip.

12. The method of claim 11, wherein the peeling off of the at least one removable backing strip comprises removing both the first and second removable backing strips by peeling away at least one respective edge of each of the first and second removable backing strips.

13. The method of claim 10, wherein the at least one removable backing strip imparts a degree of rigidity to the adhesive strip so as to enhance the adherence of the adhesive portion to the skin.

14. The method of claim 10, wherein:

the adherence of the upper portion of the adhesive portion to the skin forms a moisture vapor seal between the adhesive portion and the skin of the wearer so as to limit fogging of optical apparatus used by the wearer while wearing the mask; and the adhesive strip comprises a film dressing configured to accommodate distortion of at least a portion thereof during the pressing so as to enable formation of the moisture vapor seal.

15. A method of donning a mask having (i) an air-permeable portion configured to be placed over a mouth and nose of a wearer, the air-permeable portion comprising at least a top edge; (ii) at least one strap which is configured to secure the mask to the wearer; and (iii) a first strip having a first adhesive portion comprising a lower portion configured to adhere to the top edge of the air-permeable portion, and an upper portion which extends above the top edge of the air-permeable portion and is configured to adhere to at least malar skin of the wearer, the method comprising:

engaging the at least one strap to secure the mask to the wearer;

removing from a rear side of the mask a first removable backing strip, the first removable backing strip covering the first adhesive portion, the removing exposing the first adhesive portion;

placing the mask over at least the mouth and the nose of the wearer while pressing on at least one second removable backing strip disposed on an outward-facing side of the first strip so as to cause adherence of the first adhesive portion to the at least malar skin, the adherence forming a moisture vapor seal between the first adhesive portion and the at least malar skin of the wearer so as to limit fogging of optical apparatus used by the wearer while wearing the mask; and removing the at least one second removable backing strip disposed on the outward-facing side of the first strip;

wherein the at least one second removable backing strip (i) imparts a degree of rigidity to the first strip so as to enhance the adherence of the first adhesive portion to the at least malar skin, and (ii) comprises third and fourth removable backing strips respectively covering left and right sides of the outward-facing side of the first strip, the third and fourth removable backing strips configured to be peeled off after the adherence of the first adhesive portion to the at least malar skin.

16. The method of claim 15, wherein the removing the at least one second removable backing strip comprises removing both the third and fourth removable backing strips by peeling away at least one respective edge of each of the first and second backing strips.

17. The method of claim 15, wherein:

the first strip comprises a film dressing configured to accommodate distortion of at least a portion thereof during the pressing so as to enable formation of the moisture vapor seal; and the placing of the mask over at least the mouth and the nose of the wearer while pressing on the at least one second removable backing strip disposed on the outward-facing side of the first strip so as to cause the adherence of the first adhesive portion to the at least malar skin comprises placing the mask such that the first adhesive portion is not substantially in contact with infero-periorbital skin.

18. The method of claim 15, wherein the first and second removable backing strips comprise two minimally adherent waxed paper backing strips.

19. A mask comprising:

an air-permeable portion configured to be placed over a mouth and nose of a wearer;

at least one strap which is configured to secure the mask to a head of the wearer; and an adhesive strip, the adhesive strip comprising:

a back side comprising an adhesive portion, wherein a lower portion of the adhesive portion is configured to adhere to the air-permeable portion of the mask and an upper portion of the adhesive portion is configured to adhere to skin of the wearer of the mask; and a front side, the front side having two removable backing strips coupled thereto, the two removable backing strips covering left and right sides of the front side of the adhesive strip and configured to (i) enable a pressing of the upper portion of the adhesive portion against a face of the wearer, and (ii) be removed after the upper portion of the adhesive portion is adhered to the skin of the wearer of the mask.

20. The mask of claim 19, wherein the adhesive portion is configured to at least minimize contact with periorbital skin of the wearer when the mask is worn, the minimization of contact mitigating trauma to the periorbital skin of the wearer when the mask is removed therefrom.

* * * * *